US010712643B2

(12) United States Patent
Sugiyama et al.

(10) Patent No.: US 10,712,643 B2
(45) Date of Patent: Jul. 14, 2020

(54) PROJECTOR WITH COOLING SYSTEM

(71) Applicant: SEIKO EPSON CORPORATION, Tokyo (JP)

(72) Inventors: Nobuo Sugiyama, Azumino (JP); Naoya Okada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/232,786

(22) Filed: Dec. 26, 2018

(65) Prior Publication Data
US 2019/0196311 A1 Jun. 27, 2019

(30) Foreign Application Priority Data
Dec. 27, 2017 (JP) .................. 2017-251908

(51) Int. Cl.
G03B 21/16 (2006.01)
F28D 15/02 (2006.01)
F28D 15/04 (2006.01)
F28D 21/00 (2006.01)
G03B 21/00 (2006.01)
G03B 33/12 (2006.01)

(52) U.S. Cl.
CPC ......... *G03B 21/16* (2013.01); *F28D 15/0283* (2013.01); *F28D 15/04* (2013.01); *F28D 21/0015* (2013.01); *F28D 2021/0028* (2013.01); *G03B 21/006* (2013.01); *G03B 33/12* (2013.01)

(58) Field of Classification Search
CPC .. G03B 21/006; G03B 21/16; G03B 21/2013; G03B 21/2033
See application file for complete search history.

(56) References Cited

U.S. PATENT DOCUMENTS

| 5,032,021 A | * | 7/1991 | Kanatani | G02F 1/133385 348/E5.141 |
| 2002/0191159 A1 | | 12/2002 | Nagao et al. | |
| 2009/0086169 A1 | * | 4/2009 | Nakamura | G03B 21/006 353/31 |
| 2011/0032489 A1 | * | 2/2011 | Kimoto | G03B 21/16 353/56 |
| 2011/0037954 A1 | | 2/2011 | Tsuchiya et al. | |

(Continued)

FOREIGN PATENT DOCUMENTS

| JP | 11223464 | * | 6/1999 |
| JP | 11223464 A | * | 8/1999 |

(Continued)

OTHER PUBLICATIONS

Apr. 2, 2019 Extended Search Report issued in European Patent Application No. 18215340.3.

*Primary Examiner* — Sultan Chowdhury
(74) *Attorney, Agent, or Firm* — Oliff PLC

(57) ABSTRACT

A projector includes a light source device configured to emit light, a light modulator configured to modulate the light emitted from the light source device in accordance with an image signal, a projection optical device configured to project the light modulated by the light modulator, and a cooler configured to cool a cooling target based on transformation of a refrigerant into a gas. The cooler includes a refrigerant generator configured to generate the refrigerant and a refrigerant sender configured to send the generated refrigerant toward the cooling target.

24 Claims, 24 Drawing Sheets

(56) References Cited

U.S. PATENT DOCUMENTS

| | | | |
|---|---|---|---|
| 2011/0242499 A1 | 10/2011 | Terao | |
| 2015/0219345 A1 | 8/2015 | Kijima | |
| 2015/0226417 A1 | 8/2015 | Hirose | |
| 2016/0147034 A1* | 5/2016 | Shoujiguchi | F28D 15/02 359/512 |
| 2017/0374326 A1* | 12/2017 | Aikoh | F21V 7/22 |
| 2018/0224173 A1* | 8/2018 | DelVentura | F28D 15/02 |

FOREIGN PATENT DOCUMENTS

| | | |
|---|---|---|
| JP | 2002-107698 A | 4/2002 |
| JP | 2002-372748 A | 12/2002 |
| JP | 2005-202195 A | 7/2005 |
| JP | 2007-294655 A | 11/2007 |
| JP | 2009/075304 A | 4/2009 |
| JP | 2010-085676 A | 4/2010 |
| JP | 2010-107751 A | 5/2010 |
| JP | 2011-215457 A | 10/2011 |
| JP | 2015-148729 A | 8/2015 |

\* cited by examiner

PROJECTOR WITH COOLING SYSTEM

BACKGROUND

1. Technical Field

The present invention relates to a projector.

2. Related Art

To cool a projector, there is, for example, a proposed air-cooling cooler using an air blower (see JP-A-2002-107698, for example), a liquid-cooling cooler using a pump that delivers a refrigerant liquid and a pipe through which the refrigerant liquid passes (see JP-A-2007-294655, for example).

In recent years, increase in luminance of light outputted from a projector and other factors increase the amount of heat produced by a cooling target to be cooled by a cooler, and improvement in the cooling performance of the cooler is therefore required. To improve the cooling performance of the coolers using, for example, air-cooling or liquid-cooling described above, however, the coolers are enlarged, resulting in a problem of an increase in the size of the projector. Further, in the case of the air-cooling, there is also a problem of an increase in noise produced by the air blower.

SUMMARY

An advantage of some aspects of the invention is to provide a projector including a cooler that not only excels in cooling performance but is compact and excels in quietness.

A projector according to an aspect of the invention is a projector including a light source device configured to emit light, a light modulator configured to modulate the light emitted from the light source device in accordance with an image signal, a projection optical device configured to project the light modulated by the light modulator, and a cooler configured to cool a cooling target based on transformation of a refrigerant into a gas, and the cooler includes a refrigerant generator configured to generate the refrigerant and a refrigerant sender configured to send the generated refrigerant toward the cooling target.

In the projector according to the aspect of the invention, the cooler is so configured that the refrigerant sender sends the refrigerant generated by the refrigerant generator to the cooling target and transformation of the refrigerant into a gas, which is an endothermic reaction, can be used to draw heat from the cooling target to cool the cooling target. The cooling based on the transformation of the refrigerant into a gas can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler is readily reduced as compared with the size required by air cooling or liquid cooling.

Further, in the cooling based on the transformation of the refrigerant into a gas, the cooling performance can be improved by an increase in the surface area where the refrigerant that is transformed into a gas comes into contact with the cooling target. Increasing the cooling performance of the cooler therefore does not cause an increase in noise. The projector according to the aspect of the invention can therefore be configured to excel in cooling performance, have a compact size, and excel in quietness.

In the projector according to the aspect of the invention, in which the refrigerant generator can generate the refrigerant, a user's convenience can be improved because the user does not need to replenish the refrigerant. Since the refrigerant generator can generate a necessary amount of refrigerant as necessary, no refrigerant needs to be stored, for example, in a storage tank, whereby the weight of the projector can be reduced.

The refrigerant generator may include a moisture absorbing/discharging member rotating, a first air blower configured to deliver air to a portion of the moisture absorbing/discharging member that is a portion located in a first region, a heat exchanger connected to the refrigerant sender, a heater configured to heat a portion of the moisture absorbing/discharging member that is a portion located in a second region different from the first region, and a second air blower configured to deliver air around the portion of the moisture absorbing/discharging member that is the portion heated by the heater to the heat exchanger, and the heat exchanger, by cooling the air having flowed into the heat exchanger, may generate the refrigerant from the air having flowed into the heat exchanger.

According to the configuration described above, the moisture absorbing/discharging member can absorb water vapor contained in the air delivered from the first air blower, and the moisture absorbed by the moisture absorbing/discharging member can be discharged in the form of water vapor into the air delivered by the second air blower. The heat exchanger can then condense the moisture discharged in the form of water vapor into the air to generate the refrigerant. The refrigerant can therefore be generated from the atmosphere in the projector.

The heat exchanger may be cooled by air having been exhausted from the first air blower and having passed through the moisture absorbing/discharging member.

According to the configuration described above, no cooling section that cools the heat exchanger needs to be separately provided, whereby an increase in the number of parts of the projector can be avoided. Further, an increase in noise produced by the projector can be avoided unlike in a case where an air blower is separately provided as the cooling section that cools the heat exchanger.

The first air blower may deliver air to the cooling target.

According to the configuration described above, the refrigerant sent by the air to the cooling target is readily transformed into a gas, whereby the cooling target can be further cooled. Further, since no air blower that cools the cooling target needs to be separately provided, an increase in the number of parts of the projector can be avoided, and an increase in the noise can be avoided.

Further, for example, in a case where the first air blower is an intake fun that takes outside air into the projector, and even when the power of the first air blower is lowered, the same cooling performance provided in a case where no cooler is provided can still be provided. The noise produced by the first air blower, which is an intake fan, can therefore be reduced by lowering the power of the first air blower, whereby the quietness of the projector can be further improved.

The refrigerant generator may have a circulation path along which the air exhausted from the second air blower circulates, and the circulation path may pass through the moisture absorbing/discharging member and the heat exchanger.

According to the configuration described above, configuring the circulation path as a roughly sealed path can prevent the air outside the projector from entering the circulation path, whereby the humidity of the air delivered to the heat exchanger can be maintained relatively high. Cooling the heat exchanger therefore allows the refrigerant to be preferably generated.

The second air blower may cause air to pass through the portion of the moisture absorbing/discharging member that is the portion located in the second region to deliver the air to the heat exchanger, and the heat exchanger may include a heating main body configured to heat the air before passing through the portion of the moisture absorbing/discharging member that is the portion located in the second region, and the second air blower.

According to the configuration described above, the heater, in which the second air blower delivers the air to the moisture cooling target member, can heat the portion of the moisture absorbing/discharging member that is the portion located in the second region. The heater can therefore heat the moisture absorbing/discharging member even in a case where the heating main body is located in a position separate from the moisture absorbing/discharging member. The heater can therefore be configured with improved flexibility.

The heater may use heat from the light source device to heat the portion of the moisture absorbing/discharging member that is the portion located in the second region.

According to the configuration described above, since the heat from the light source device can be used, no energy needs to be separately supplied to heat the portion of the moisture absorbing/discharging member that is the portion located in the second region. The electric power consumed by the refrigerant generator can therefore be reduced.

The second air blower may cause air to pass through the portion of the moisture absorbing/discharging member that is the portion located in the second region to deliver the air to the heat exchanger. The refrigerant generator may include a first duct through which the air before passing through the portion of the moisture absorbing/discharging member that is the portion located in the second region flows. The heater may include a heat sink so provided as to be present both in an interior and an exterior of the first duct, and the second air blower. The heat sink may be heated by the heat from the light source device.

According to the configuration described above, the light source device can readily heat the heat sink from the exterior of the first duct. The heat from the light source device can therefore be readily used to heat the air in the first duct, and the heated air can be delivered by the second air blower to heat the moisture absorbing/discharging member.

The heater may include a heat pipe connected to the light source device.

According to the configuration described above, the heat from the light source device can be used to heat the moisture absorbing/discharging member.

The second air blower may cause air to pass through the portion of the moisture absorbing/discharging member that is the portion located in the second region to deliver the air to the heat exchanger. The refrigerant generator may include a first duct through which the air before passing through the portion of the moisture absorbing/discharging member that is the portion located in the second region flows. The first duct may include a metal section made of a metal. The heater may include the metal section and the second air blower. The metal section may be heated by the heat from the light source device.

According to the configuration described above, the heat from the light source device can heat the metal section to heat the air in the metal section, that is, the air in the first duct. Using the heat from the light source device to heat the air in the first duct and delivering the heated air via the second air blower therefore allows the moisture absorbing/discharging member to be heated.

The refrigerant generator may include a driving force converter configured to generate driving force that rotates the moisture absorbing/discharging member from an air flow.

According to the configuration described above, the air delivered from the first air blower to the moisture absorbing/discharging member can be used to rotate the moisture absorbing/discharging member. No driver that rotates the moisture absorbing/discharging member therefore needs to be separately provided, whereby the electric power consumed by the refrigerant generator can be reduced.

The driving force converter may include a vane provided on the moisture absorbing/discharging member.

According to the configuration described above, the air delivered from the first air blower to the moisture absorbing/discharging member can be used to rotate the moisture absorbing/discharging member. No driver that rotates the moisture absorbing/discharging member therefore needs to be separately provided, whereby the electric power consumed by the refrigerant generator can be reduced.

The refrigerant generator may include a driver configured to rotate the moisture absorbing/discharging member.

According to the configuration described above, the moisture absorbing/discharging member can be stably rotated at a fixed speed. Therefore, the portion of the moisture absorbing/discharging member that is the portion located in the first region can preferably absorb water vapor from the air, and the portion of the moisture absorbing/discharging member that is the portion located in the second region can preferably discharge moisture into the air. The refrigerant can therefore be efficiently generated.

The heat exchanger may include a flow passage section through which the air having flowed into the heat exchanger flows, and the flow passage section may include a plurality of tubular pipes extending in one direction and may be cooled by a cooling medium flowing in a direction in which the flow passage section has a smallest dimension out of directions that intersect the one direction.

According to the configuration described above, the distance over which the air passing by the flow passage section travels can be shortened. An excessive increase in the temperature of the air passing by the flow passage section can therefore avoided, whereby the entire flow passage section can be efficiently cooled. The refrigerant can therefore be efficiently generated in the flow passage section.

The refrigerant generator may include a thermoelectric device having a heat absorbing surface and a heat radiating surface, a first heat exchanger connected to the heat absorbing surface and the refrigerant sender, a second heat exchanger connected to the heat radiating surface, and a third air blower configured to cool the second heat exchanger, and the first heat exchanger may condense water vapor in air to generate the refrigerant.

According to the configuration described above, the air can cool the second heat exchanger, to which the thermoelectric device is attached, to generate the refrigerant from the atmosphere around the thermoelectric device. The one third air blower only therefore needs to be provided as an air blower necessary for the generation of the refrigerant. The number of air blowers can therefore be reduced, whereby the quietness of the projector can be further improved.

The third air blower may cool the cooling target.

According to the configuration described above, the cooling target can be further cooled. Further, the transformation of the refrigerant into a gas can be facilitated. The cooling target can therefore be further cooled.

The cooling target may include a light modulation unit including the light modulator and a hollow first holder configured to hold the light modulator, the refrigerant sender may include a second duct having an interior that communicates with an interior of the first holder and send the refrigerant to the interior of the first holder via the second duct.

The configuration described above can prevent the refrigerant having been transformed into a gas from flowing along the optical path of the light modulator in the light modulation unit, which is the cooling target. The configuration described above can thus prevent the light modulator from being fogged and can therefore prevent formation of noise in an image projected from the projector.

Air delivered from the third air blower may be delivered from the interior of the first holder to the interior of the second duct.

According to the configuration described above, the air can cause the refrigerant having been transformed into a gas to return to the refrigerant sender. Part of the refrigerant having been transformed into a gas and having returned to the refrigerant sender condenses again into the refrigerant, which is delivered to the first holder in the light modulation unit, which is the cooling target. The thus generated refrigerant can therefore be used again, whereby the cooling efficiency can be improved.

The first heat exchanger may be disposed in the interior of the second duct.

According to the configuration described above, the refrigerant generated by condensation of water vapor in the first heat exchanger is readily sent by the refrigerant sender.

The second heat exchanger may be disposed in an exterior of the second duct.

According to the configuration described above, the air delivered from the third air blower is readily sprayed to the second heat exchanger, whereby the second heat exchanger is readily cooled.

A plurality of protruding sections may be arranged on an inner surface of the second duct, and the refrigerant sender may send the refrigerant based on capillarity that occurs in gaps between the plurality of protruding sections.

According to the configuration described above, no pump or any other power source for sending the refrigerant needs to be separately provided. An increase in the number of parts of the projector can therefore be avoided, whereby the size and weight of the projector are readily reduced.

The refrigerant sender may send the refrigerant based on capillarity.

According to the configuration described above, no pump or any other power source for sending the refrigerant needs to be separately provided. An increase in the number of parts of the projector can therefore be avoided, whereby the size and weight of the projector are readily reduced.

The refrigerant sender may include a connector formed of a porous member and connecting the refrigerant generator to the cooling target.

According to the configuration described above, the connector can absorb the refrigerant and send the refrigerant based on capillarity.

The projector may further include a refrigerant holder provided on the cooling target and configured to hold the refrigerant.

According to the configuration described above, the refrigerant holder can hold the refrigerant sent to the cooling target until the refrigerant is transformed into a gas to cool the cooling target. The generated refrigerant is therefore readily used with no waste, whereby the cooling performance of the cooler can be further improved.

The refrigerant holder may be attached to a surface of the cooling target and formed of a porous member, and at least part of the refrigerant holder may be exposed when viewed from a refrigerant holder side in a layering direction in which the cooling target and the refrigerant holder are layered on each other.

According to the configuration described above, the refrigerant is readily transformed into a gas via the exposed portion of the refrigerant holder, whereby the cooling performance of the cooler can be further improved. Further, the refrigerant holder, which is formed of a porous member, readily uniformly distributes the refrigerant across the surface of the cooling target, which is provided with the refrigerant holder, based on capillarity to readily further cool the cooling target.

The projector may further include a fixing member fixing the refrigerant holder. The cooling target may include a light modulation unit including the light modulator and a second holder holding the light modulator. The refrigerant holder may be attached to a surface of the second holder. The fixing member may fix the refrigerant holder in such away that the fixing member and the second holder sandwich the refrigerant holder in the layering direction. Part of the refrigerant holder may be exposed when viewed from a fixing member side in the layering direction.

According to the configuration described above, the refrigerant holder can be fixed to the second holder with no adhesive adhering to the refrigerant holder. A situation in which the refrigerant holder is unlikely to hold the refrigerant can therefore be avoided.

The refrigerant holder may be provided on a surface of the second holder on a light incident side of the light modulator.

The configuration described above can prevent the water vapor that is the refrigerant discharged from the refrigerant holder and transformed into a gas from affecting light that exits out of the light modulator and can therefore prevent formation of noise in an image projected from the projector.

The fixing member may include a frame section surrounding an edge portion of an image formation region of the light modulator. The frame section can prevent light, out of the light incident on the light modulator, reflected off a metal mask or any other component provided on an outer edge portion of the light modulator from returning to the light incident side of the light modulator. The frame section can therefore prevent formation of noise in an image projected from the projector.

The refrigerant holder may be provided on both a surface of the second holder on the light incident side of the light modulator and a surface of the second holder a light exit side of the light modulator.

According to the configuration described above, an area of the cooling target that is the area where the refrigerant is transformed into a gas can be increased, whereby the cooling target can be further cooled.

The light modulation unit may be formed of a plurality of light modulation units. The refrigerant holder may be provided in each of the plurality of light modulation units. The projector may further include a linkage section formed of a porous member and configured to link the refrigerant holders provided in the plurality of light modulation units to one another.

According to the configuration described above, connecting the refrigerant sender to one of the refrigerant holders allows the refrigerant to be sent to the other refrigerant holders. The routing of the refrigerant sender in the projector can therefore be simplified.

The linkage section may be provided with a coating that covers the linkage section.

According to the configuration described above, a situation in which the refrigerant that moves along the linkage sections is transformed into a gas via the linkage sections can be avoided. Therefore, a situation in which the refrigerant is transformed into a gas without contributing to the cooling of the cooling target can be avoided, whereby no waste of the generated refrigerant occurs.

The refrigerant holder may be formed of a plurality of refrigerant holders, and the plurality of refrigerant holders may protrude from a surface of the cooling target and may be arranged with gaps therebetween.

According to the configuration described above, the refrigerant can be held between the refrigerant holders. The generated refrigerant can thus be readily used with no waste, whereby the cooling efficiency can be improved.

The cooling target may include at least one of the light modulator, the light modulation unit including the light modulator, the light source device, a wavelength conversion element that converts a wavelength of the light outputted from the light source device, a diffuser element that diffuses the light outputted from the light source device, and a polarization conversion element that converts a polarization direction of the light outputted from the light source device.

According to the configuration described above, the above-mentioned portions of the projector can be cooled.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projectors according to embodiments of the invention will be described below with reference to the drawings. The scope of the invention is not limited to the following embodiments and can be arbitrarily changed within the scope of the technical idea of the invention. In the following drawings, for clarity of each configuration, the scale, the number, and other factors of the structure of the configuration differ from the scale, the number, and the other factors of an actual structure in some cases.

First Embodiment

Figure 1:
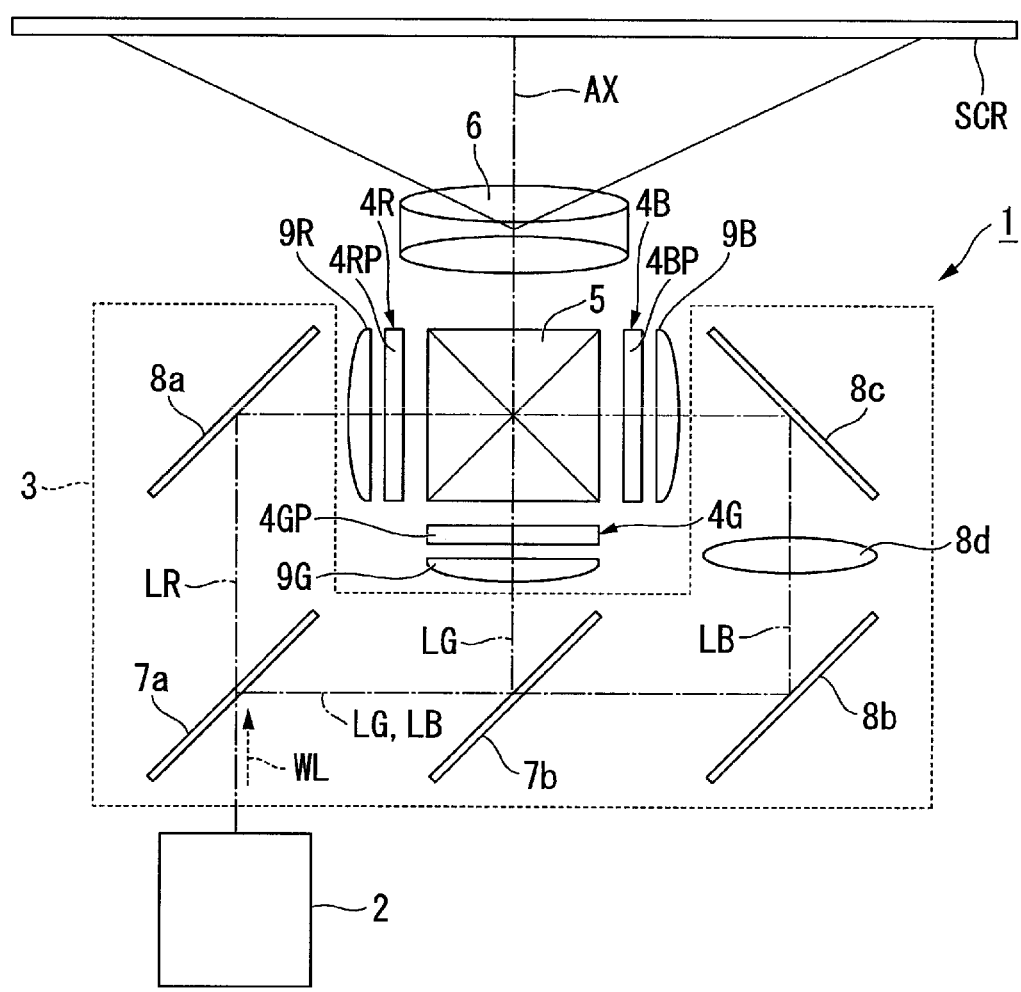
FIG. 1 is a schematic configuration diagram showing a projector according to a first embodiment.
Figure 2:
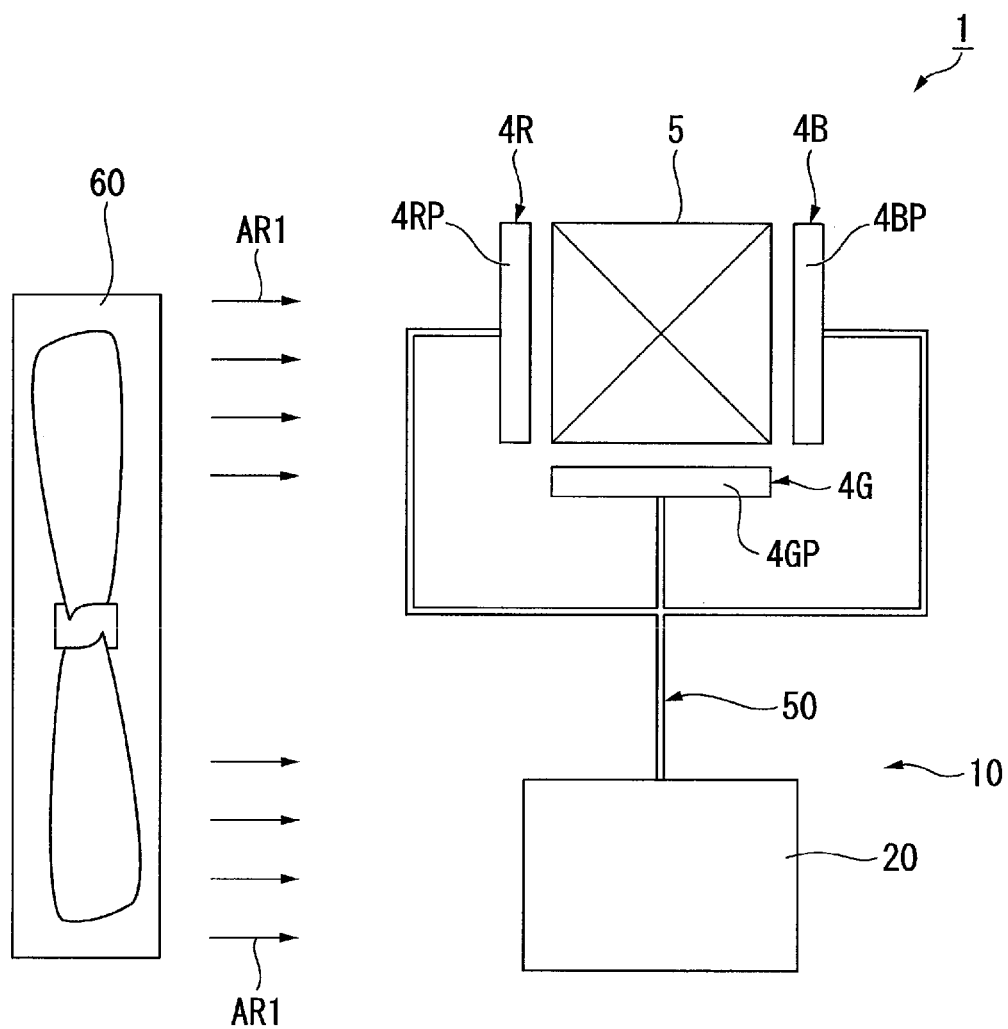
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source device 2, a color separation system 3, light modulation units 4R, 4G, and 4B, a light combining system 5, and a projection optical device 6, as shown in FIG. 1. The light modulation unit 4R includes a light modulator 4RP. The light modulation unit 4G includes a light modulator 4GP. The light modulation unit 4B includes a light modulator 4BP.

The light source device 2 outputs illumination light WL, which is so adjusted to have a roughly uniform illuminance distribution, toward the color separation system 3. The light source device 2 includes, for example, a semiconductor laser as a light source. The color separation system 3 separates the illumination light WL from the light source device 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source device 2 into the red light LR and light containing the green light LG and the blue light LB mixed with each other. The first dichroic mirror 7a is characterized in that it transmits the red light LR and reflects the green light LG and the blue light LB. The second dichroic mirror 7b separates the light containing the green light LG and the blue light LB mixed with each other into the green light LG and the blue light LB. The second dichroic mirror 7b is characterized in that it reflects the green light LG and transmits the blue light LB.

The first reflection mirror 8a is disposed in the light path of the red light LR and reflects the red light LR having passed through the first dichroic mirror 7a toward the light modulator 4RP. The second reflection mirror 8b and the third reflection mirror 8c are disposed in the light path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light from the light source device 2 in accordance with an image signal. The light modulator 4GP modulates the green light LG out of the light from the light source device 2 in accordance with an image signal. The light modulator 4BP modulates the blue light LB out of the light from the light source device 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a roughly cubic shape. The light combining system 5 combines the color image light fluxes from the light modulators 4RP, 4GP, and 4BP with one another. The light combining system 5 outputs the combined image light toward the projection optical device 6. The projection optical device 6 is formed of a group of projection lenses. The projection optical device 6 enlarges the combined image light from the light combining system 5, that is, the light fluxes modulated by the light modulators 4RP, 4GP, and 4BP and projects the enlarged image light toward a screen SCR. An enlarged color image (video images) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target (light modulation units 4R, 4G, and 4B in the present embodiment) vaporizes so as to be capable of drawing heat from the cooling target, whereby the cooler 10 can cool the cooling target. The refrigerant generator 20 and the refrigerant sender 50 will be described below in detail.

Figure 3:
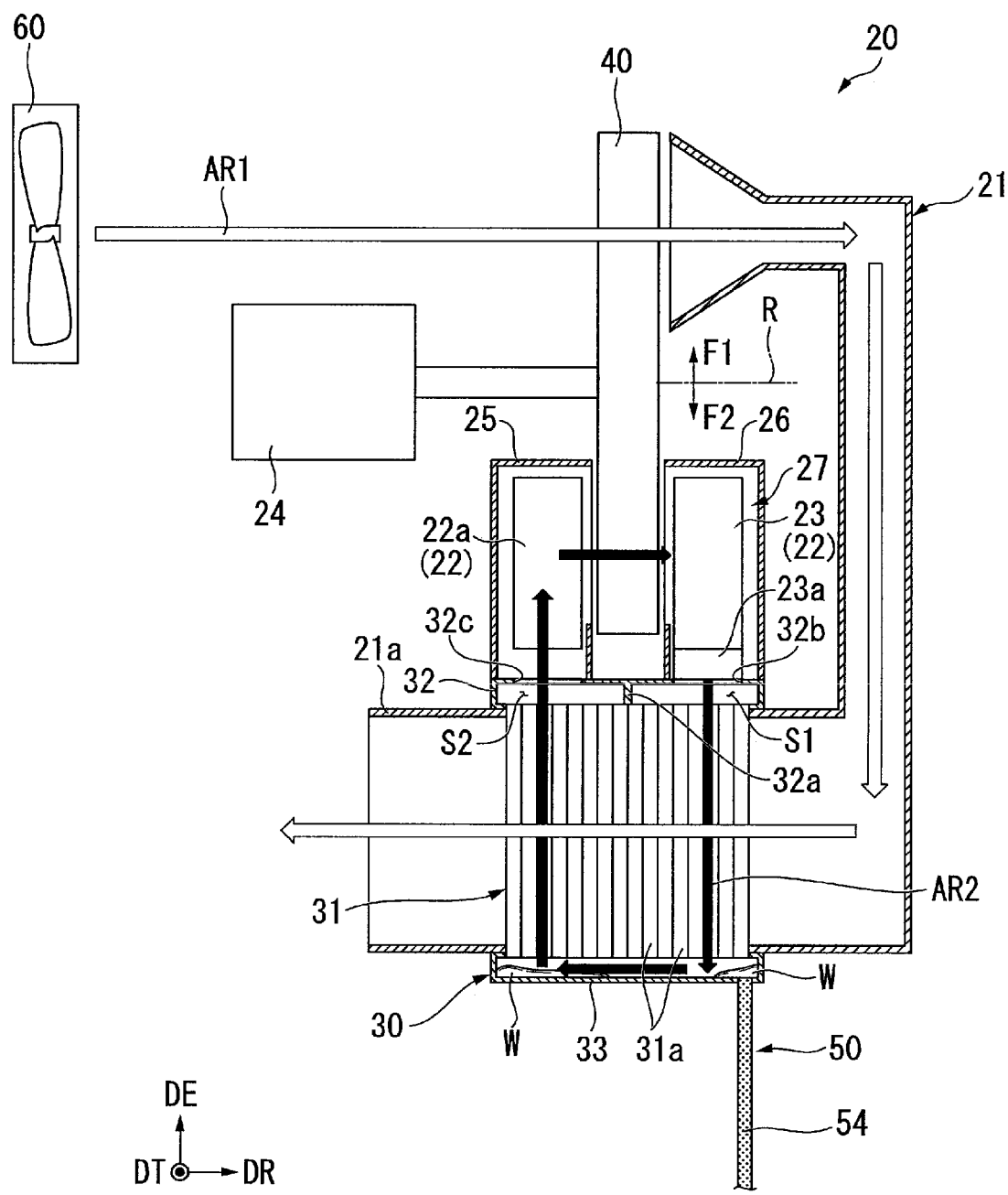
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor (driver) 24, a first air blower 60, a heat exchanger 30, a circulation duct (first duct) 25, a circulation duct 26, a heater 22, a second air blower 23, and a cooling duct 21, as shown in FIG. 3.

Figure 4:
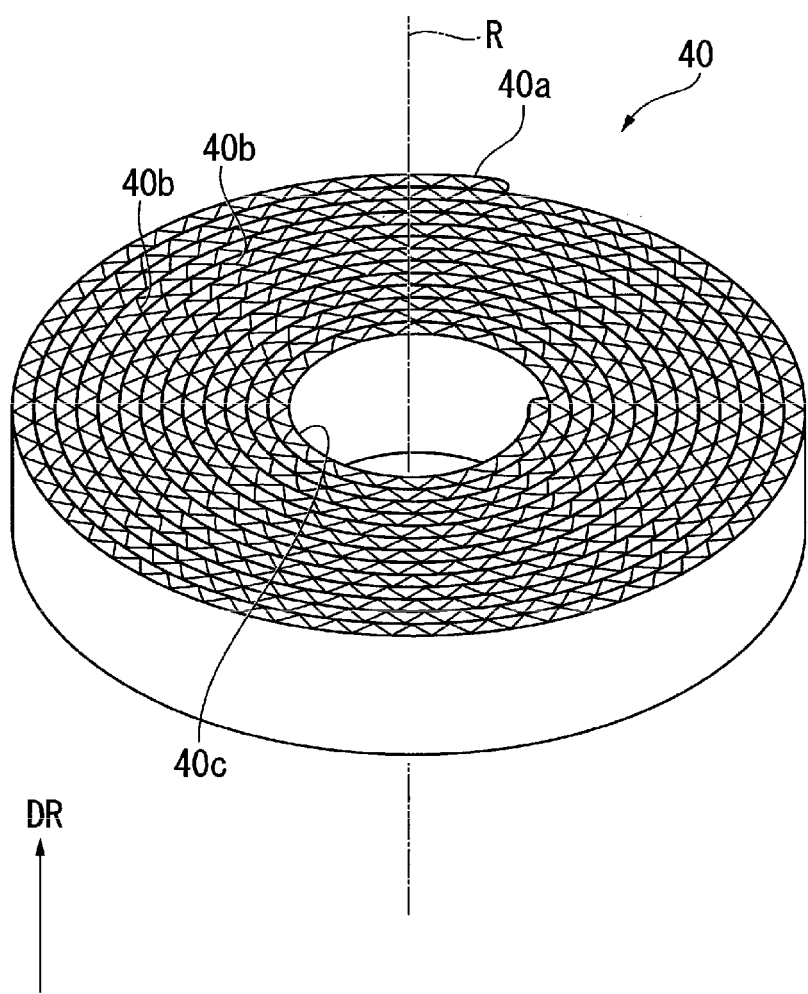
FIG. 4 is a perspective view of a moisture absorbing/discharging member in the first embodiment.

FIG. 4 is a perspective view of the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. The surface of the wound band-shaped member 40a that is the surface exposed to the ambient environment includes the outer surface of the moisture absorbing/discharging member 40, the inner circumferential surface of the central hole 40c, and inner surface of each of the through holes 40b. The moisture absorbing/discharging member 40 may instead be entirely made of a substance that absorbs and discharges moisture. An example of the substance that absorbs and discharges moisture may include zeolite.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 1 rpm but smaller than or equal to 5 rpm.

The first air blower 60 is, for example, an intake fan that takes outside air into the projector 1. The first air blower 60 delivers air AR1 to a portion of the moisture absorbing/discharging member 40 that is the portion located in a first region F1. The first region F1 is a region on one side of the axis of rotation R (upper side in FIG. 3) in the direction perpendicular to the axis of rotation R. On the other hand, the region on the other side of the axis of rotation R (lower side in FIG. 3) in the direction perpendicular to the axis of rotation R, that is, the region opposite the first region F1 is a second region F2.

The first air blower 60 delivers the air AR1 also to the light modulation units 4R, 4G, and 4B, which are each the cooling target, as shown in FIG. 2. The first air blower 60 is not limited to a specific device and may be any device capable of delivering the air AR1, for example, an axial fan and a centrifugal fan.

Figure 5:
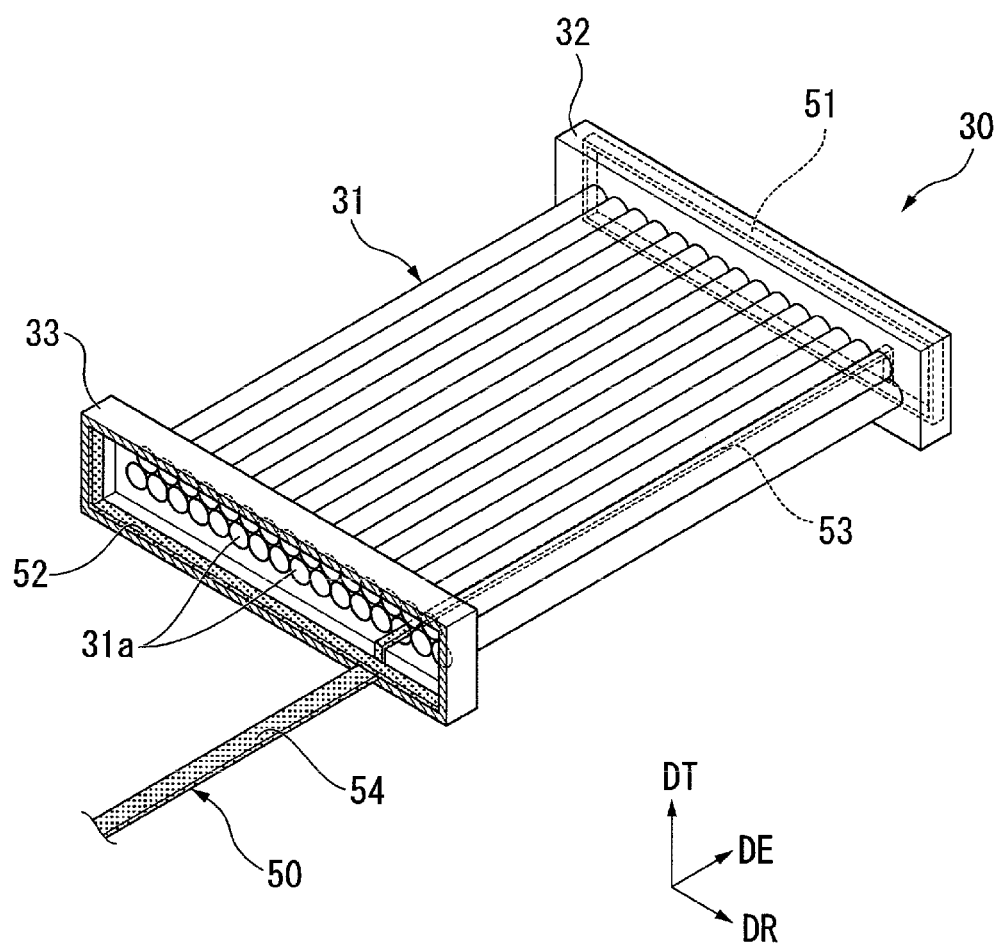
FIG. 5 is a partial cross-sectional perspective view showing a heat exchanger in the first embodiment.

The heat exchanger 30 is a portion that generates the refrigerant W. FIG. 5 is a partial cross-sectional perspective view showing the heat exchanger 30. The heat exchanger 30 includes a flow passage section 31, a first lid 32, and a second lid 33, as shown in FIG. 5.

The flow passage section 31 includes a plurality of pipes 31a, which each have a tubular shape and extend in one direction. In the present embodiment, the one direction, in which the pipes 31a, extend is, for example, perpendicular to the rotational axis direction DR. The pipes 31a each open at the opposite ends thereof in the one direction, in which the pipe 31a extends. The pipes 31a each have, for example, a circular cross-sectional shape perpendicular to the one direction, in which the pipe 31a extends. In the following description, the one direction, in which the pipes 31a extend, is called an "extension direction DE" and drawn as appropriate in the form of an axis DE. The first region F1 and the second region F2 described above are separate with respect to the axis of rotation R from each other in the extension direction DE perpendicular to the rotational axis direction DR.

In the present embodiment, the flow passage section 31 is formed by layering a plurality of layers, which are each formed of the plurality of pipes 31a arranged in the rotational axis direction DR, on each other in the direction perpendicular to both the rotational axis direction DR and the extension direction DE. In the following description, the direction perpendicular to both the rotational axis direction DR and the extension direction DE is called a "thickness direction DT" and drawn as appropriate in the form of an axis DT. In the present embodiment, the dimension of the flow passage section 31 in the thickness direction DT is, for example, smaller than the dimension of the flow passage section 31 in the rotational axis direction DR and is the smallest of the dimensions of the flow passage section 31 in the directions perpendicular to the extension direction DE.

The first lid 32 is connected to an end of the flow passage section 31 that is the end on one side in the extension direction DE (+DE side). The first lid 32 has the shape of a rectangular parallelepiped elongated in the rotational axis direction DR. One end of each of the pipes 31a in the extension direction DE opens in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on the right of the second space S2 (+DR side).

A communication hole 32b, which allows the first space S1 to be continuous with the interior of the circulation duct 26, is formed in the first lid 32. A communication hole 32c, which allows the second space S2 to be continuous with the interior of the circulation duct 25, is formed in the first lid 32.

The second lid 33 is connected to an end of the flow passage section 31 that is the end on the other side in the extension direction DE (−DE side), that is, the end opposite the end to which the first lid 32 is connected. The second lid 33 has the shape of a rectangular parallelepiped elongated in the rotational axis direction DR, as shown in FIG. 5. The other end of each of the pipes 31a in the extension direction DE opens in the second lid 33. The interior of the second lid 33 is not partitioned, unlike the first lid 32. The interior of the second lid 33 is continuous with the first space S1 and the second space S2 in the first lid 32 via the interior of the pipes 31a of the flow passage section 31. The second lid is connected to the refrigerant sender 50. The heat exchanger 30 is thus connected to the refrigerant sender 50. In FIG. 5, a wall of the second lid 33 that is the wall located on the other side in the extension direction DE is omitted.

The circulation duct 26 is a duct disposed on one side of the moisture absorbing/discharging member 40 in the rotational axis direction DR (+DR side), as shown in FIG. 3. The circulation duct 26 has an inlet that faces a portion of the moisture absorbing/discharging member 40 that is the portion located in the second region F2 and opens toward the other side in the rotational axis direction DR (−DR side). The circulation duct 26 has an outlet continuous with the communication hole 32b in the first lid 32.

The circulation duct 25 is a duct disposed on the other side of the moisture absorbing/discharging member 40 in the rotational axis direction DR (−DR side). The circulation duct 25 has an outlet that faces a portion of the moisture absorbing/discharging member 40 that is the portion located in the second region F2 and opens toward the one side in the rotational axis direction DR (+DR side). The circulation duct 25 has an inlet continuous with the communication hole 32c in the first lid 32.

The heater 22 includes a heating main body 22a. The heating main body 22a is disposed in the circulation duct 25. The heating main body 22a is disposed on the other side, in the rotational axis direction DR (−DR side), of a portion of the moisture absorbing/discharging member 40 that is the portion located in the second region F2. The heating main body 22a is, for example, an electric heater. The heating main body 22a heats the atmosphere in the circulation duct 25. In the present embodiment, the heater 22 includes the second air blower 23.

The second air blower 23 is disposed in the circulation duct 26. The second air blower 23 is disposed on the one side (+DR side), in the rotational axis direction DR, of a portion of the moisture absorbing/discharging member 40 that is the portion located in the second region F2. The second air blower 23 is, for example, a centrifugal fan. The second air blower 23 exhausts air sucked from the other side in the rotational axis direction DR (−DR side) via an exhaust port 23a toward the other side in the extension direction DE (−DE side). The exhaust port 23a opens toward the communication hole 32b in the first lid 32. The second air blower 23 delivers the air into the first space S1 via the communication hole 32b.

The air discharged from the second air blower 23 into the first space S1 is the air having been sucked from the other side of the second air blower 23 in the rotational axis direction DR (−DR side) via the inlet of the circulation duct and having passed through a portion of the moisture absorbing/discharging member 40 that is the portion located in the second region F2. That is, the second air blower 23 causes air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed in the circulation duct 25. The heating main body 22a therefore heats the air before passing through a portion of the moisture absorbing/discharging member 40 that is the portion located in the second region F2.

As described above, in the present embodiment, the heater 22 is so configured that the second air blower 23 delivers the air heated by the heating main body 22a to a portion of the moisture absorbing/discharging member 40 that is the portion located in the second region F2 to heat a portion of the moisture absorbing/discharging member 40 that is the portion located in the second region F2. The second air blower thus delivers air around a portion of the moisture absorbing/discharging member 40 that is the portion heated by the heater 22 to the heat exchanger 30.

The air having flowed from the second air blower 23 into the heat exchanger 30 via the first space S1 passes through the pipes 31a continuous with the first space S1 out of the plurality of pipes 31a and flows into the second lid 33. The air having flowed into the second lid 33 passes through the pipes 31a continuous with the second space S2 out of the plurality of pipes 31a, flows into the second space S2, and flows into the circulation duct 25 via the communication hole 32c. The air having flowed into the circulation duct 25 is heated by the heating main body 22a, passes through a portion of the moisture absorbing/discharging member 40 that is the portion located in the second region F2 again, flows into the circulation duct 26, and is sucked by the second air blower 23.

As described above, in the present embodiment, the refrigerant generator 20 has a circulation path 27, through which the air exhausted from the second air blower 23 circulates. The circulation path 27 is formed of at least the circulation ducts 25 and 26 and the heat exchanger 30. The circulation path 27 passes through the heating main body 22a, the moisture absorbing/discharging member 40, and the heat exchanger 30. The circulation path 27 is roughly sealed although slight gaps are provided between the moisture absorbing/discharging member 40 and the circulation ducts 25, 26, and there is therefore no entry of air outside the circulation path 27 into the circulation path 27. In the following description, the air exhausted from the second air blower 23 and circulating through the circulation path 27 is called air AR2.

The cooling duct 21 is a duct having an inlet disposed on the one side (+DR side), in the rotational axis direction DR, of a portion of the moisture absorbing/discharging member 40 that is the portion located in the first region F1. Air flowing into the cooling duct 21 is the air AR1 having been exhausted from the first air blower 60 and having passed through a portion of the moisture absorbing/discharging member 40 that is the portion located in the first region F1. The cooling duct 21 extends from the one side of a portion of the moisture absorbing/discharging member 40 that is the portion located in the first region F1 toward the heat exchanger 30.

The cooling duct 21 includes a cooling passage 21a, which extends in the rotational axis direction DR. The flow passage section 31 of the heat exchanger 30 is so disposed in the cooling passage 21a as to pass thereacross in the extension direction DE. The flow passage section 31 is thus disposed in the cooling passage 21a. The air AR1 passing through the cooling passage 21a is sprayed onto the outer surface of the flow passage section 31 and passes by the flow passage section 31 in the rotational axis direction DR. The flow passage section 31 is thus cooled by the air AR1. That is, the heat exchanger 30 is cooled by the air AR1 having been exhausted from the first air blower 60 and having passed through the moisture absorbing/discharging member 40. In FIG. 3, in the cooling passage 21a, the air AR1 passes by the flow passage section 31 from right to left. The cooling passage 21a has an open end facing the other side in the rotational axis direction DR (−DR side). The opening of the cooling passage 21a is, for example, of an outlet of the cooling duct 21.

When the air AR1 is delivered from the first air blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 moves the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 is thus vaporized, and the vaporized moisture is discharged into the air AR2.

The air AR2 containing the water vapor absorbed from the air AR1 when the air AR1 passes through the moisture absorbing/discharging member 40 is delivered by the second air blower 23 to the heat exchanger 30. The air AR2 having flowed from the first space S1 into the heat exchanger 30 flows through the flow passage section 31. In more detail, the air AR2 flows through part of the pipes 31a of the flow passage section 31. The flow passage section 31 is externally cooled by the air AR1 flowing in the rotational axis direction DR through the cooling passage 21a of the cooling duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The heat exchanger 30, when cooled, thus generates the refrigerant W from the air AR2 having flowed into the heat exchanger 30.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, third catchers 53, and a connector 54, as shown in FIG. 5.

The first catcher 51 is fixed to an edge portion of the inner surface of the first lid 32 that is the edge portion facing the one side in the extension direction DE (+DE side). The first catcher 51 has a thin-band-like shape and is formed in a rectangular-frame-like shape extending along the edge portion of the first lid 32. The second catcher 52 is fixed to an edge portion of the inner surface of the second lid 33 that is the edge portion facing the other side in the extension direction DE (−DE side). The second catcher 52 has a thin-band-like shape and is formed in a rectangular-frame-like shape extending along the edge portion of the second lid 33.

The third catchers 53 extend from the first catcher 51, pass through the pipes 31a, and reach the second catcher 52, so that the third catchers 53 connect the first catcher 51 to the second catcher 52. The third catchers 53 each have a thin-band-like shape extending in the extension direction DE.

The connector 54 is a portion that connects the refrigerant generator 20 to the cooling target. In the present embodiment, the connector 54 is connected to the second catcher 52 and extends from the interior of the second lid 33, passes through the wall of the second lid 33, and protrudes out of the second lid 33. The connector 54, which protrudes out of the second lid 33, extends to the light modulation unit 4G, which is the cooling target (see FIG. 6). The connector 54 has a thin-band-like shape. The width of the connector 54 is, for example, greater than the width of the first catcher 51, the width of the second catcher 52, and the width of the third catchers 53.

The light modulation units 4R, 4G, and 4B, which are each the cooling target in the present embodiment, will next be described in more detail. In the following description, it is assumed that an upward/downward direction Z having a positive side being the upper side and a negative side being the lower side is drawn as appropriate in the form of an axis Z. The direction parallel to an optical axis AX of a projection lens of the projection optical device 6 that is the projection lens closest to the light exiting side, that is, the direction parallel to the direction in which the projection optical device 6 projects light is called an "optical axis direction X" and is drawn as appropriate in the form of an axis X. The optical axis direction X is perpendicular to the upward/downward direction Z. The direction perpendicular to both the optical axis direction X and the upward/downward direction Z is called a "width direction Y" and is drawn as appropriate in the form of an axis Y.

The upward/downward direction Z and the upper and lower sides are merely names for describing the relative positional relationship among the portions of the projector, and an actual arrangement and other factors of the portions may differ from the arrangement and other factors indicated by the names.

Figure 6:
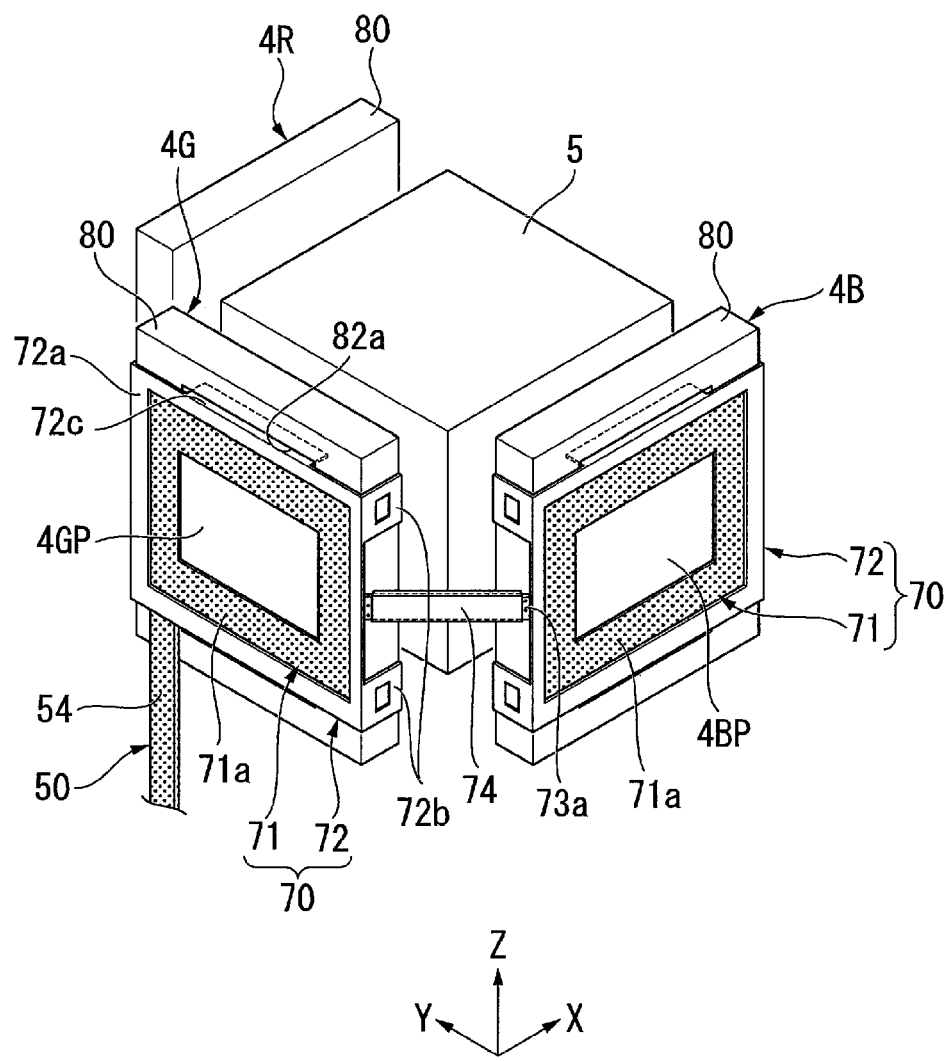
FIG. 6 is a perspective view showing light modulation units and a light combining system in the first embodiment.
Figure 7:
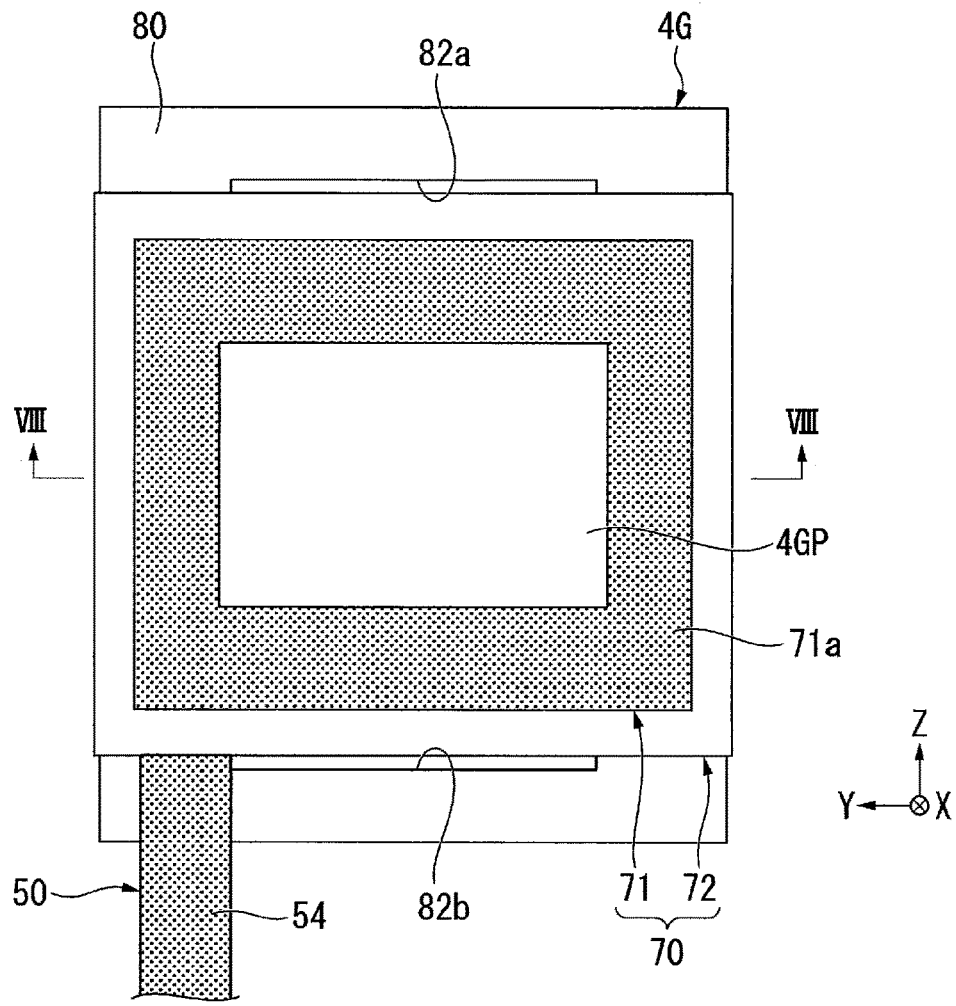
FIG. 7 shows one of the light modulation units in the first embodiment viewed from the light incident side.
Figure 8:
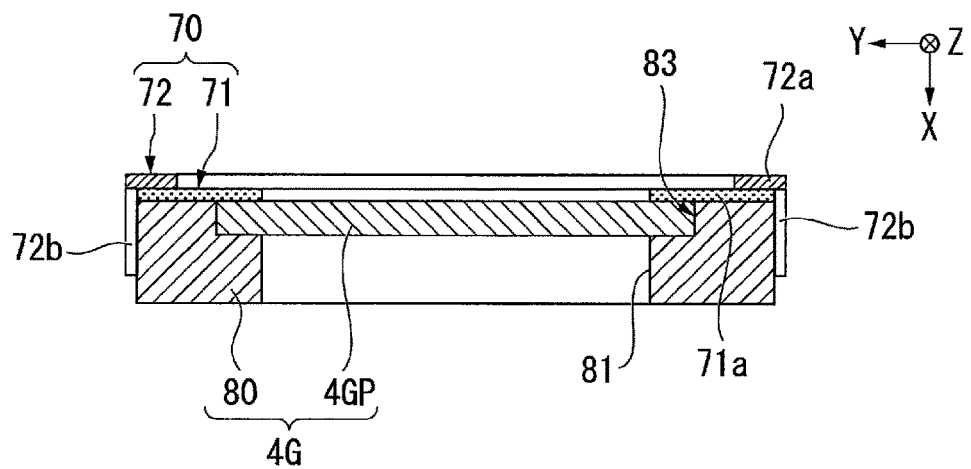
FIG. 8 is a cross-sectional view of the one light modulation unit in the first embodiment taken along the line VIII-VIII in FIG. 7.

FIG. 6 is a perspective view showing the light modulation units 4R, 4G, and 4B and the light combining system 5. FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides of the light combining system 5 as to sandwich the light combining system 5 in the width direction Y. The light modulation unit 4G is disposed on the light incident side (−X side) of the light combining system 5 in the optical axis direction X. The light modulation units 4R, 4G, and 4B have the same structure except that they are disposed in different positions and take different attitudes, and only the light modulation unit 4G will therefore be representatively described below in some cases.

The light modulation unit 4G includes a holding frame (second holder) 80, which holds the light modulator 4GP. The holding frame 80 has the shape of a roughly rectangular parallelepiped that is flat in the direction in which light is incident on the light modulator 4GP and elongated in the upward/downward direction Z, as shown in FIGS. 6 to 8. The direction in which light is incident on the light modulator 4GP is, for example, the optical axis direction X.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−X side in FIG. 8). The light modulator 4GP is so held by the holding frame 80 as to be fit into the stepped section 83. Insertion grooves 82a and 82b are formed through a surface of the holding frame 80 that is the surface facing the light incident side and in portions on the opposite sides of the holding frame 80 in the upward/downward direction Z, as shown in FIG. 7.

The projector 1 further includes a cooling facilitator 70 provided as part of the light modulation unit 4G, which is the cooling target, as shown in FIGS. 6 to 8. The cooling facilitator 70 includes a refrigerant holder 71 and a fixing member 72. The refrigerant holder 71 is attached to the surface of the holding frame 80, which holds the light modulation unit 4G, which is the cooling target. In the present embodiment, the refrigerant holder 71 is provided on a surface of the holding frame 80 that is the surface facing the side toward which light is incident on the light modulator 4GP (−X side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
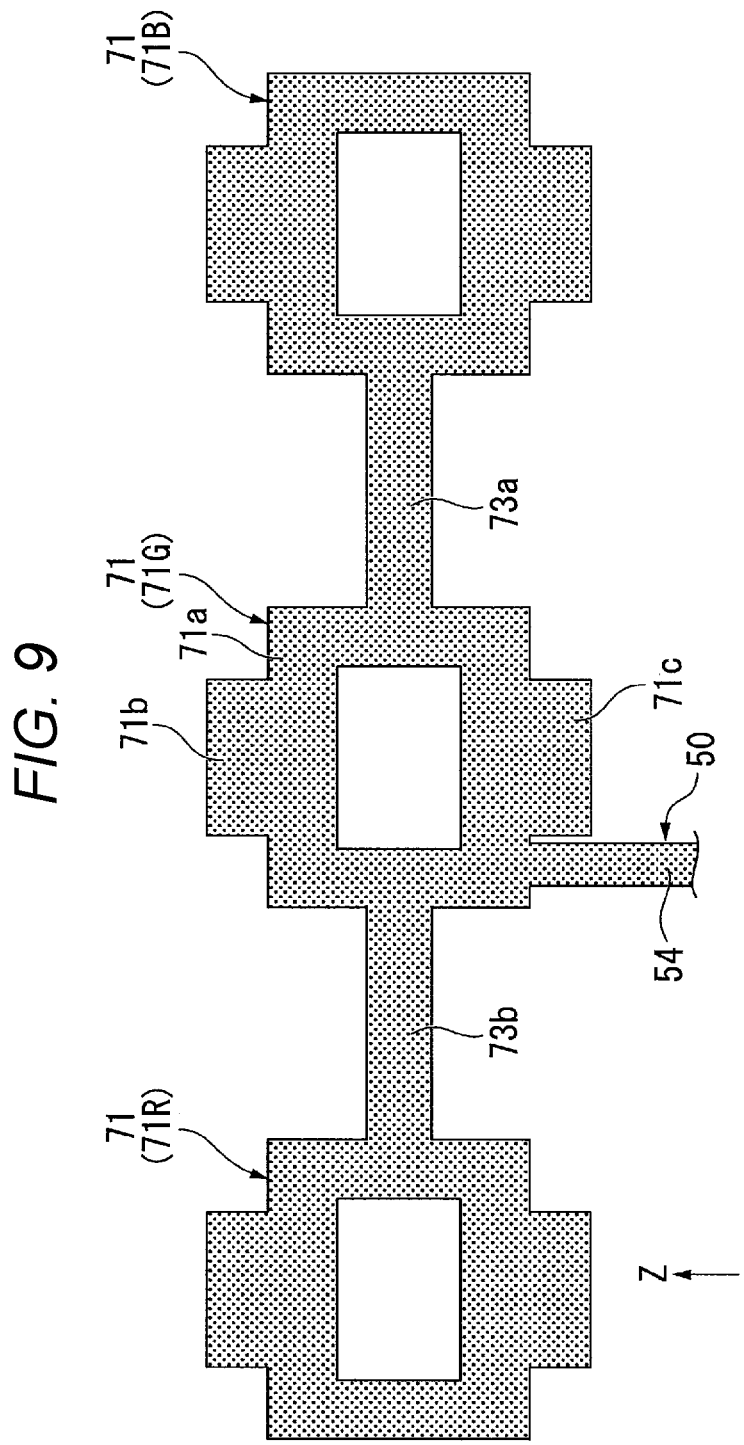
FIG. 9 shows refrigerant holders in the first embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a that are the opposite ends in the upward/downward direction Z, as shown in FIG. 9. The main body section 71a covers part of a surface of the holding frame 80 that is the surface facing the side toward which light is incident on the light modulator 4GP (−X side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of a metal. The fixing member 72 includes a frame section 72a, which has a rectangular-frame-like shape, attachment sections 72b, and insertion sections 72c. The frame section 72a covers an outer edge portion of the refrigerant holder 71, as shown in FIGS. 7 and 8. The holding frame 80, the refrigerant holder 71, and the frame section 72a are layered on each other in the direction in which light passes through the light modulator unit 4G (optical axis direction X). In the following description, the direction in which the holding frame 80, the refrigerant holder 71, and the frame section 72a are layered on each other is simply called a "layering direction." The fixing member 72 fixes the refrigerant holder 71 in such a way that the frame section 72a and the holding frame 80 sandwich the refrigerant holder 71 in the layering direction (optical axis direction X).

The inner edge of the frame section 72a is so provided as to be shifted outward from the inner edge of the refrigerant holder 71. A portion of the refrigerant holder 71, that is, in the present embodiment, the portion inside the frame section 72a is exposed when viewed in the layering direction from the side facing the fixing member 72.

The attachment sections 72b are provided at four end portions of the frame section 72a, opposite end portions in the upward/downward direction Z and opposite end portions in the width direction Y, as shown in FIGS. 6 and 8. The attachment sections 72b protrude from the frame section 72a toward the holding frame 80 (+X side). The attachment sections 72b engage with protrusions provided on the side surface of the holding frame 80. The fixing member 72 is thus fixed to the holding frame 80.

The insertion sections 72c are provided at the opposite ends of the frame section 72a in the upward/downward direction Z. The insertion sections 72c protrude from the frame section 72a toward the holding frame 80 (+X side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b.

The linkage section 73a links the refrigerant holder 71G attached to the light modulation unit 4G to the refrigerant holder 71B attached to the light modulation unit 4B. The refrigerant holder 71B is thus connected to the refrigerant sender 50 (connector 54) via the refrigerant holder 71G. The linkage section 73a is provided with a coating 74, which coats the linkage section 73a, as shown in FIG. 6. The coating 74 is, for example, a film made of a resin.

The linkage section 73b links the refrigerant holder 71 attached to the light modulation unit 4G to the refrigerant holder 71 attached to the light modulation unit 4R. The refrigerant holder 71R is thus connected to the refrigerant sender 50 (connector 54) via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held in the refrigerant holders 71 then vaporizes to cool the light modulation units 4R, 4G, and 4B, which are each the cooling target.

According to the present embodiment, the cooler 10 is so configured that the refrigerant sender 50 can send the refrigerant W generated by the refrigerant generator 20 to the cooling target and vaporization of the refrigerant W, which is an endothermic reaction, can be used to draw heat from the cooling target to cool the cooling target. The cooling based on the vaporization of the refrigerant W can actively draw heat from the cooling target and therefore has excellent cooling performance as compared with air cooling and liquid cooling, in which the cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore does not cause an increase in noise. According to the present embodiment, the projector 1 provided with the cooler 10 which is excel in cooling performance, have a compact size, and is excel in quietness can be obtained.

According to the present embodiment, in which the refrigerant generator 20 can generate the refrigerant W, a user's convenience can be improved because the user does not need to replenish the refrigerant W. Since the refrigerant generator 20 can generate a necessary amount of refrigerant W as necessary, the refrigerant W does not need to be stored, for example, in a storage tank, whereby the weight of the projector 1 can be reduced.

According to the present embodiment, the moisture absorbing/discharging member 40 can absorb water vapor contained in the air AR1 delivered from the first air blower 60, and the moisture absorbed by the moisture absorbing/discharging member 40 can be discharged in the form of water vapor into the air AR2 delivered by the second air blower 23. The heat exchanger 30 can then condense the moisture discharged in the form of water vapor into the air AR2 to generate the refrigerant W. Therefore, according to the present embodiment, the refrigerant W can be generated from the atmosphere in the projector 1.

According to the present embodiment, the heat exchanger 30 is cooled by the air AR1 having been exhausted from the first air blower 60 and having passed through the moisture absorbing/discharging member 40. No cooling section that cools the heat exchanger 30 therefore needs to be separately provided, whereby an increase in the number of parts of the projector 1 can be avoided. Further, an increase in noise produced by the projector 1 can be avoided unlike in a case where an air blower is separately provided as the cooling section that cools the heat exchanger 30.

According to the present embodiment, the first air blower 60 delivers the air AR1 to the light modulation units 4R, 4G, and 4B, which are each the cooling target. The refrigerant W sent by the air AR1 to the light modulation units 4R, 4G, and 4B therefore readily vaporizes, whereby the light modulation units 4R, 4G, and 4B can be further cooled. Further, since no air blower that cools the cooling target needs to be separately provided, an increase in the number of parts of the projector 1 can be avoided, and an increase in the noise can be avoided.

In the present embodiment, the first air blower 60, which is an intake fun that takes the outside air into the projector 1, is used to facilitate the vaporization of the refrigerant W delivered to the cooling target, as described above. Therefore, even when the power of the first air blower 60 is lowered, the same cooling performance provided in a case where no cooler 10 is provided can still be provided. The noise produced by the first air blower 60, which is an intake fan, can therefore be reduced by lowering the power of the first air blower 60, whereby the quietness of the projector 1 can be further improved.

For example, in the refrigerant generator 20, when the humidity of the air AR2 delivered from the second air blower 23 to the heat exchanger 30 is relatively low, cooling the heat exchanger 30 is unlikely to allow generation of the refrigerant W in some cases. For example, in a case where air or any other substance outside the projector 1 mixes with the air AR2 delivered to the heat exchanger 30, the humidity of the air AR2 decreases in some cases.

In contrast, according to the present embodiment, the refrigerant generator 20 has the circulation path 27, through which the air AR2 exhausted from the second air blower 23 circulates. Configuring the circulation path 27 as a roughly sealed path can therefore prevent the air outside the projector 1 from entering the circulation path 27, whereby the humidity of the air AR2 delivered to the heat exchanger 30 can be maintained relatively high. Cooling the heat exchanger 30 therefore allows the refrigerant W to be preferably generated.

According to the present embodiment, the heater 22 includes the heating main body 22a, which heats the air before passing through a portion of the moisture absorbing/discharging member 40 that is the portion located in the second region F2, and the second air blower 23. The heater 22, in which the second air blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant sender 50 sends the refrigerant W based on capillarity. No pump or any other power source for sending the refrigerant W therefore needs to be separately provided. An increase in the number of parts of the projector 1 can therefore be avoided, whereby the size and weight of the projector 1 are readily reduced.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W having accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the catcher 51, which is provided in the first lid 32, and the third catchers 53, which connect the first catcher 51 to the second catcher 52. The first catcher 51 can therefore absorb the refrigerant W having accumulated in the first lid 32 and send the absorbed refrigerant W to the second catcher 52 via the third catchers 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catchers 53 pass through the pipes 31a. The third catchers 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catchers 53. The width of the connector 54 is therefore readily increased to a relatively large value, whereby the amount of refrigerant W that can be sent by the connector 54 can be increased. The refrigerant sender 50 can therefore readily deliver the refrigerant W to the cooling target, whereby the cooling target is readily further cooled.

On the other hand, the width of the first catcher 51, the width of the second catcher 52, and the width of the third catchers 53 are each readily set at a relatively small value. The amount of refrigerant W held by each of the first catcher 51, the second catcher 52, and the third catchers 53 can therefore be reduced. The amount of refrigerant W held by the first catcher 51, the second catcher 52, and the third catchers 53 and hence left in the heat exchanger 30 can therefore be reduced, whereby the generated refrigerant W is readily delivered with no waste to the cooling target.

According to the present embodiment, the refrigerant holders 71, which hold the refrigerant W, are provided in the light modulation units 4R, 4G, and 4B, which are each the cooling target. The refrigerant holder 71 can therefore hold the refrigerant W sent to the light modulation units 4R, 4G, and 4B in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, in a case where the refrigerant holders 71 are fixed to the holding frames 80 with an adhesive, the pores in the refrigerant holders 71, which are each formed of a porous member, are closed with the adhesive absorbed by the refrigerant holders 71 in some cases. The refrigerant holders 71 are therefore unlikely to absorb and hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with no adhesive adhering to the refrigerant holders 71. The situation in which the refrigerant holders 71 are unlikely to hold the refrigerant W can therefore be avoided. Further, in the present embodiment, the fixing members 72 are made of a metal. The fixing members 72 therefore have relatively high heat conductivity and are hence likely to be cooled. The air AR1 from the first air blower 60 and the vaporization of the refrigerant W readily lower the temperature of the fixing members 72, whereby the cooling target, which is in contact with fixing members 72, is readily further cooled.

According to the present embodiment, the refrigerant holder 71 is provided on a surface of the holding frame 80 that is the surface facing the side toward which light is incident on the light modulator 4GP. The configuration described above can prevent the water vapor that is the vaporized refrigerant W discharged from the refrigerant holder 71 from affecting the light that exits out of the light modulator 4GP toward the light combining system 5 and can therefore prevent formation of noise in an image projected from the projector 1.

According to the present embodiment, the refrigerant holders 71 are provided in the plurality of light modulation units 4R, 4G, and 4B, and the linkage sections 73a and 73b are provided and link the plurality of refrigerant holders to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the coatings 74, which coat the linkage sections 73a and 73b. A situation in which the refrigerant W that moves along the linkage sections 73a and 73b vaporizes via the linkage sections 73a and 73b can therefore be avoided. Therefore, a situation in which the refrigerant W vaporizes without contributing to the cooling of the light modulation units 4R, 4G, and 4B, which are each the cooling target, can be avoided, whereby no waste of the generated refrigerant W occurs.

In the present embodiment, the connector 54 may also be coated, as are the linkage sections 73a and 73b. The configuration described above can prevent vaporization of the refrigerant W being sent to the cooling target. Therefore, the refrigerant W can be efficiently sent to the cooling target, and waste of the generated refrigerant W can further be suppressed. The circumference of each of the connector 54 and the linkage sections 73a and 73b may instead be covered, for example, with a tube. A coating treatment that suppresses vaporization may still instead be performed on the surface of each of the connector 54 and the linkage sections 73a and 73b.

In the present embodiment, the following configurations can also be employed. In the following description, configurations similar to those described above, for example, have the same reference characters as appropriate, and no description thereof will therefore be made in some cases.

Variation 1 of First Embodiment

Figure 10:
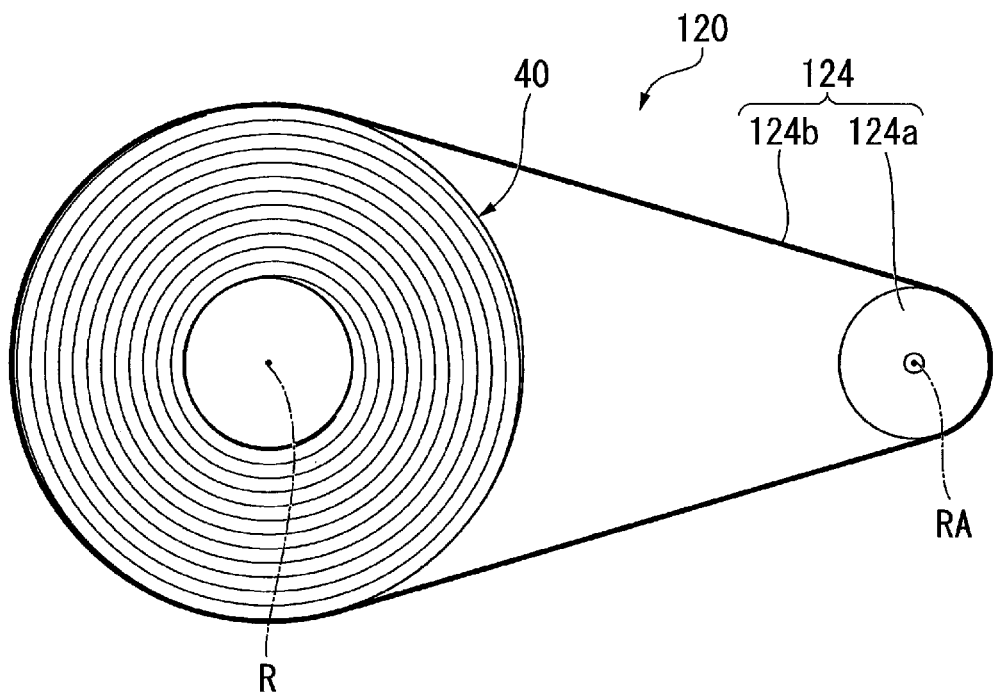
FIG. 10 diagrammatically shows part of a refrigerant generator according to Variation 1 of the first embodiment.

FIG. 10 diagrammatically shows part of a refrigerant generator 120 according to the present variation. In the present variation, the motor 24 is replaced with a driver 124, as shown in FIG. 10. The driver 124 includes a pulley 124a, a belt 124b, and a motor that is not shown but rotates the pulley 124a. The pulley 124a is rotated around an axis of rotation RA, which is parallel to the axis of rotation R. The outer diameter of the pulley 124a is smaller than the outer diameter of the moisture absorbing/discharging member 40.

The belt 124b is wound around the outer circumferential surface of the moisture absorbing/discharging member 40 and the outer circumferential surface of the pulley 124a. The belt 124b transmits the rotation of the pulley 124a to the moisture absorbing/discharging member 40. The driver 124 rotates the pulley 124a to rotate the moisture absorbing/discharging member 40 via the belt 124b.

According to the present variation, in which the outer diameter of the pulley 124a is smaller than the outer diameter of the moisture absorbing/discharging member 40, the reduced rotational speed of the motor, which is not shown, can be transmitted to the moisture absorbing/discharging member 40. The moisture absorbing/discharging member 40 is therefore readily rotated at a relatively low speed, whereby the moisture absorbing/discharging member 40 can preferably absorb and discharge moisture.

The outer diameter of the pulley 124a may instead be greater than the outer diameter of the moisture absorbing/discharging member 40 or may be equal thereto.

Variation 2 of First Embodiment

Figure 11:
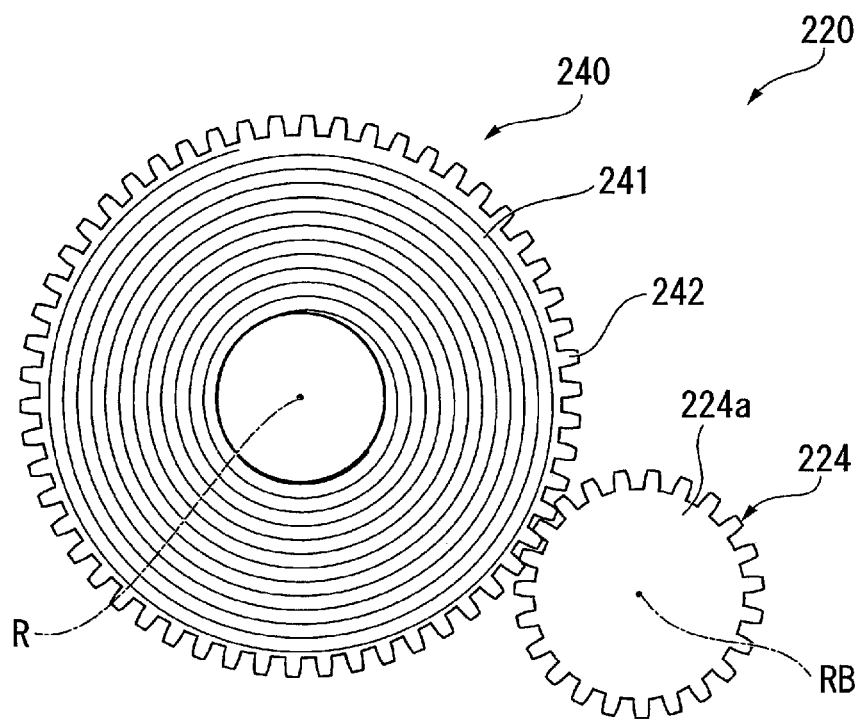
FIG. 11 diagrammatically shows part of a refrigerant generator according to Variation 2 of the first embodiment.

FIG. 11 diagrammatically shows part of a refrigerant generator 220 according to the present variation. In the present variation, the motor 24 is replaced with a driver 224, as shown in FIG. 11. The driver 224 includes a gear 224a and a motor that is not shown but rotates the gear 224a. The gear 224a is rotated around an axis of rotation RB, which is parallel to the axis of rotation R.

In the present variation, a moisture absorbing/discharging member 240 has a gear-like shape including a moisture absorbing/discharging main body 241 and a plurality of teeth 242 provided on the outer circumferential surface of the moisture absorbing/discharging main body 241. The moisture absorbing/discharging main body 241 has the same configuration as that of the moisture absorbing/discharging member 40 described above. The number of teeth 242 is, for example, greater than the number of teeth of the gear 224a.

According to the present variation, in which the number of teeth of the gear 224a is smaller than the number of teeth 242 of the moisture absorbing/discharging member 240, the reduced rotational speed of the motor, which is not shown, can be transmitted to the moisture absorbing/discharging member 240. The moisture absorbing/discharging member 240 is therefore readily rotated at a relatively low speed, whereby the moisture absorbing/discharging member 240 can preferably absorb and discharge moisture.

The number of teeth of the gear 224a may instead be greater than the number of teeth 242 of the moisture absorbing/discharging member 240 or may be equal thereto. Still instead, for example, a plurality of gears may be combined with each other and transmit the rotation of the gears to the moisture absorbing/discharging member 240.

Second Embodiment

Figure 12:
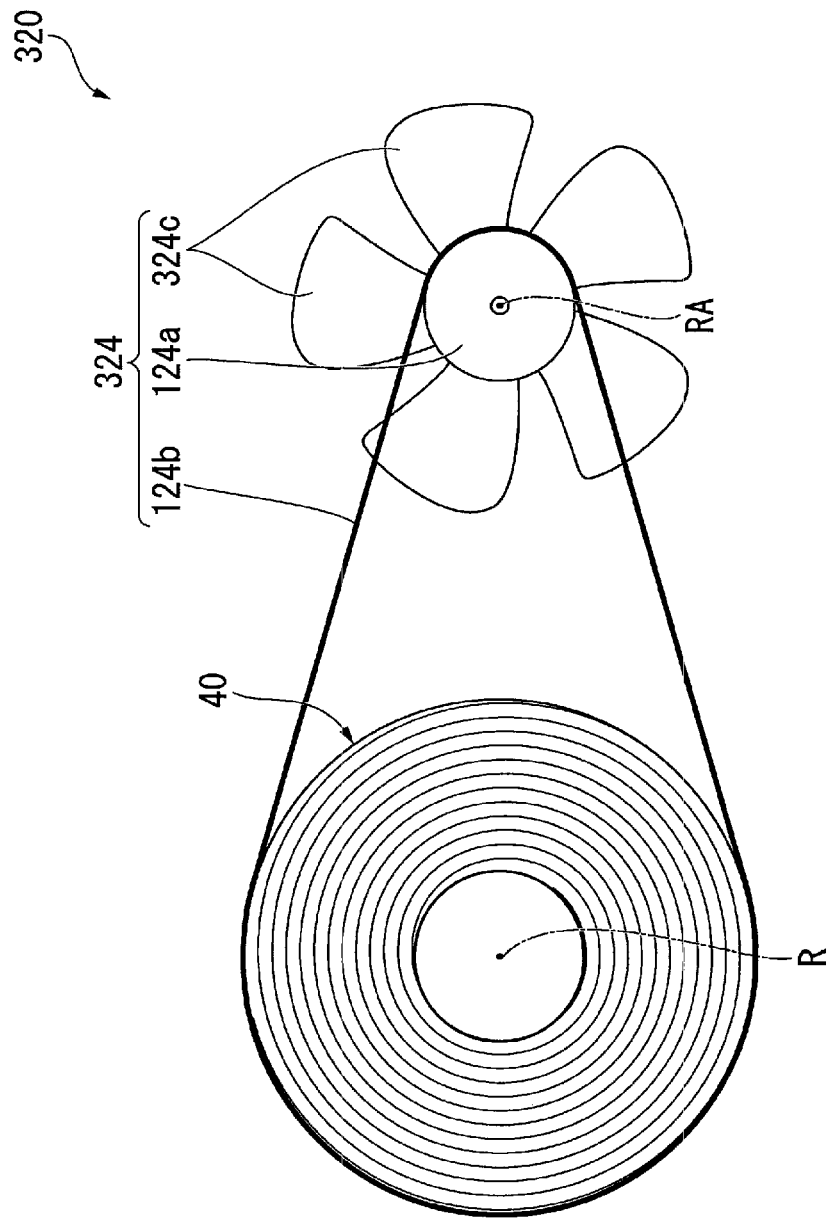
FIG. 12 diagrammatically shows part of a refrigerant generator according to a second embodiment.

A second embodiment differs from the first embodiment in that the motor 24 is replaced with a driving force converter. It is noted that configurations similar to those described above, for example, have the same reference characters as appropriate, and that no description thereof will therefore be made in some cases. FIG. 12 diagrammatically shows part of a refrigerant generator 320 according to the present embodiment.

As shown in FIG. 12, the refrigerant generator 320 according to the present embodiment includes a driving force converter 324 in place of the motor 24. The driving force converter 324 includes the pulley 124a, the belt 124b, and a plurality of vanes 324c.

The plurality of vanes 324c are so attached as to be arranged along the entire outer circumferential surface of the pulley 124a. The plurality of vanes 324c receive air flowing in the rotational axis direction DR and therefore receive force around the axis of rotation RA. Therefore, when air is delivered to the vanes 324c, the pulley 124a rotates around the axis of rotation RA. The moisture absorbing/discharging member 40 can thus be rotated via the belt 124b. The driving force converter 324 thus converts the air flow into driving force that rotates the moisture absorbing/discharging member 40. The air AR1 exhausted from the first air blower 60, is, for example, delivered to the vanes 324c.

According to the present embodiment, the driving force converter 324 can rotate the moisture absorbing/discharging member 40 by using the air AR1 exhausted from the first air blower 60. No driver that rotates the moisture absorbing/discharging member 40 therefore needs to be separately provided, whereby the electric power consumed by the refrigerant generator 320 can be reduced.

Variation of Second Embodiment

Figure 13:
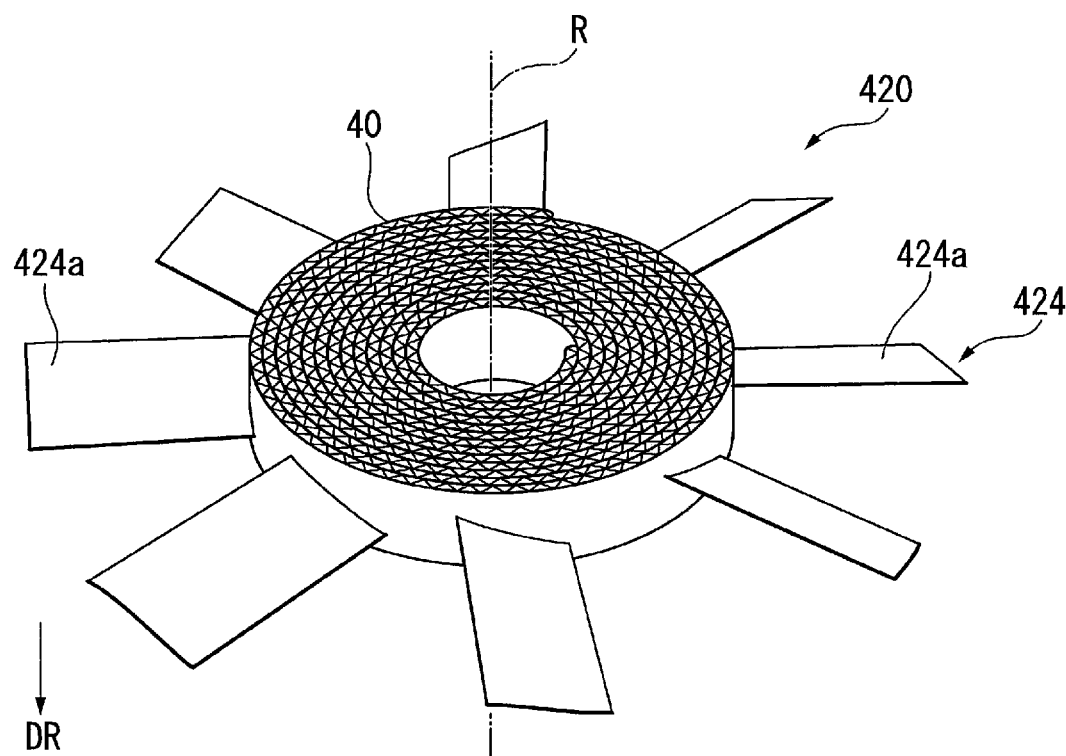
FIG. 13 is a perspective view showing part of a refrigerant generator according to a variation of the second embodiment.
Figure 14:
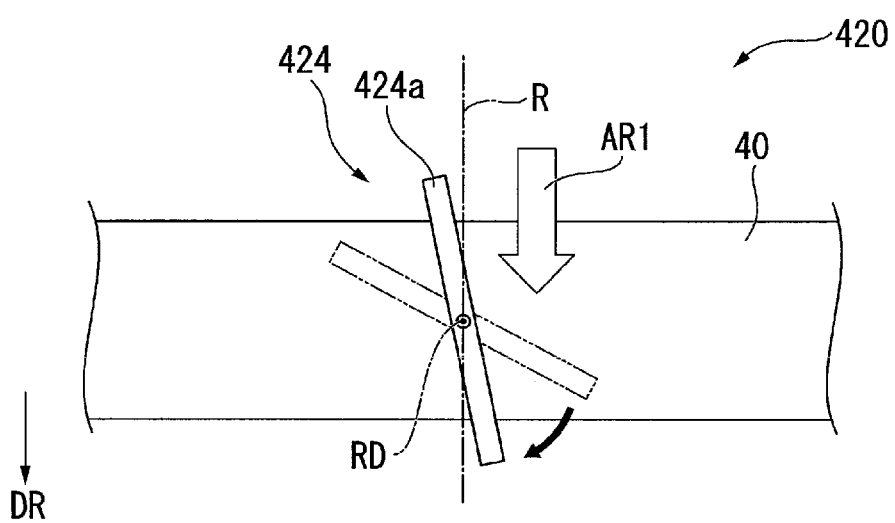
FIG. 14 shows part of the refrigerant generator according to the variation of the second embodiment viewed in the direction perpendicular to a rotational axis direction.

FIG. 13 is a perspective view showing part of a refrigerant generator 420 according to the present variation. FIG. 14 shows part of the refrigerant generator 420 according to the present variation viewed in the direction perpendicular to the rotational axis direction DR.

The refrigerant generator 420 according to the present variation includes a driving force converter 424, as shown in FIG. 13. The driving force converter 424 includes a plurality of vanes 424a provided on the moisture absorbing/discharging member 40. The plurality of vanes 424a are so attached as to be arranged along the entire outer circumferential surface of the moisture absorbing/discharging member 40. The plurality of vanes 424a receive air flowing in the rotational axis direction DR and therefore receive force around the axis of rotation R. Therefore, when air is delivered to the vanes 424a, the moisture absorbing/discharging member 40 rotates around the axis of rotation R.

The vanes 424a in the present variation are each pivotable around a pivotal axis RD extending along the radial direction with respect to the axis of rotation R, as shown in FIG. 14. The vanes 424a, when the air AR1 flowing in the rotational axis direction DR is sprayed is sprayed thereto, each pivot in such a way that the angle of the surface of the vane 424a decreases with respect to the rotational axis direction DR. Although not shown, the driving force converter 424 includes elastic members that exert elastic force, when the vanes 424a pivot, on the vanes 424a in the direction opposite the direction in which vanes 424a pivot.

According to the present variation, in which the driving force converter 424 includes the vanes 424a provided on the moisture absorbing/discharging member 40, can rotate the moisture absorbing/discharging member 40 by using the air AR1 delivered from the first air blower 60 to the moisture absorbing/discharging member 40. No driver that rotates the moisture absorbing/discharging member 40 therefore needs to be separately provided, whereby the electric power consumed by the refrigerant generator 420 can be reduced.

Further, according to the present variation, the vanes 424a are each pivotable around the pivotal axis RD, and the elastic members is provided and exert elastic force on the vanes 424a in the direction opposite the direction in which vanes 424a pivot. Therefore, even in a case where the air AR1 delivered to the vanes 424a has a relatively high speed, the air AR1 causes the vanes 424a to pivot, whereby the force around the axis of rotation R produced by the air AR1 exerted on the vanes 424a can be reduced. The moisture absorbing/discharging member 40 is therefore readily rotated at a relatively low speed, whereby the moisture absorbing/discharging member 40 can preferably absorb and discharge moisture.

Further, since the elastic members are provided, the higher the speed of the air AR1, the greater the pivotal angle of the vanes 424a, whereas the lower the speed of the air AR1, the smaller the pivotal angle of the vanes 424a. The force around the axis of rotation R produced by the air AR1 exerted on the vanes 424a is readily set at a roughly fixed value even when the speed of the air AR1 changes. The rotational speed of the moisture absorbing/discharging member 40 is readily fixed irrespective of the speed of the sprayed air AR1.

In the present variation, the configuration in which the vanes 424a are attached to the moisture absorbing/discharging member 40, but not necessarily, and the moisture absorbing/discharging member itself may be so shaped as to have vanes. That is, the moisture absorbing/discharging member may include vanes that absorb and discharge moisture. The moisture absorbing/discharging member including vanes does not necessarily have a specific shape. The moisture absorbing/discharging member may have the shape of the impeller of an axial fan or the shape of an impeller of a centrifugal fan.

Third Embodiment

Figure 15:
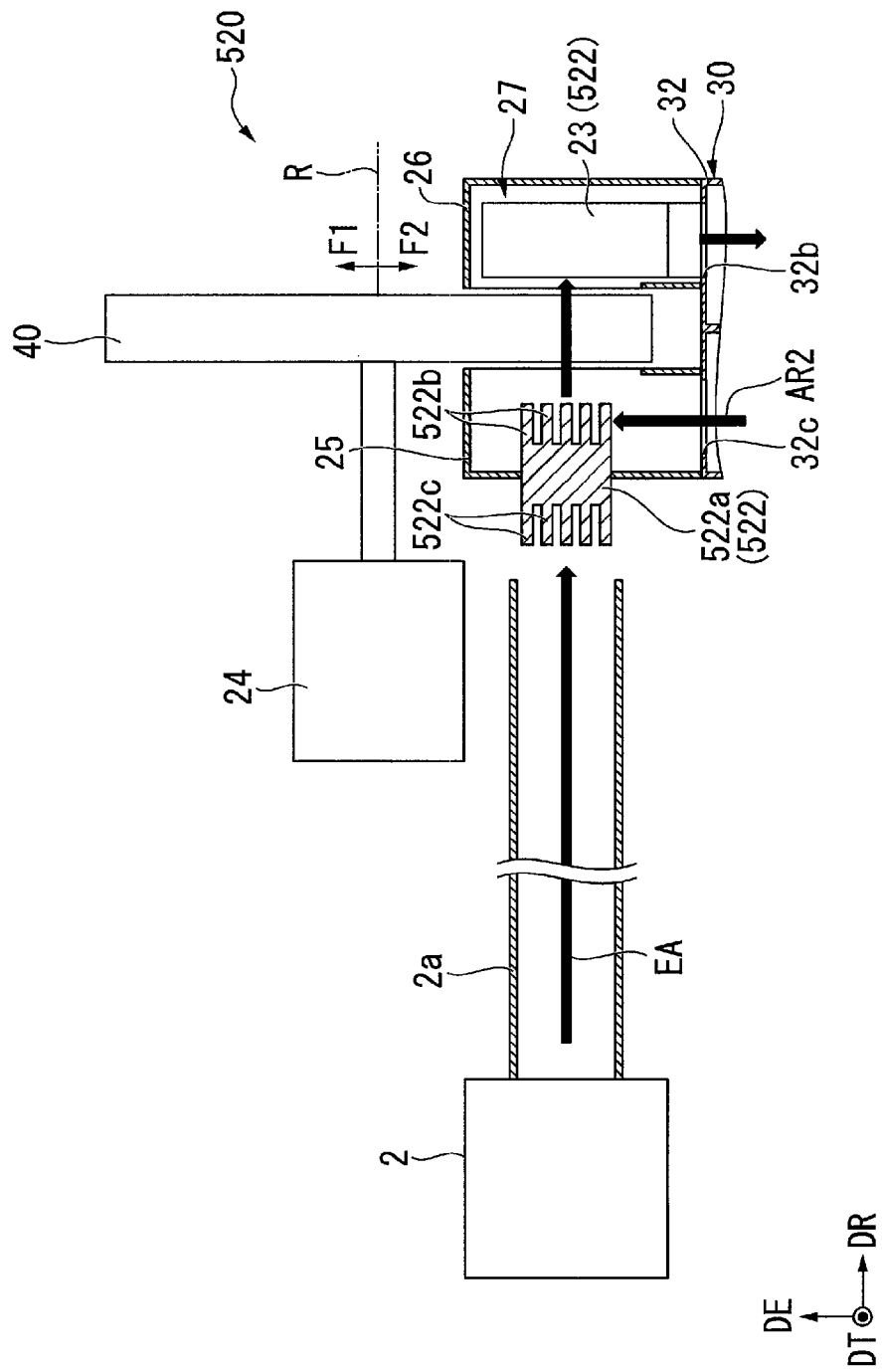
FIG. 15 diagrammatically shows part of a refrigerant generator according to a third embodiment.

A third embodiment differs from the first embodiment in terms of the configuration of the heater. It is noted that configurations similar to those described above, for example, have the same reference characters as appropriate, and that no description thereof will therefore be made in some cases. FIG. 15 diagrammatically shows part of a refrigerant generator 520 according to the present embodiment.

In the refrigerant generator 520 according to the present embodiment, a heater 522 includes a heat sink (heating main body) 522a and the second air blower 23, as shown in FIG. 15. The heat sink 522a is so provided as to be present both in the interior and the exterior of the circulation duct 25. The heat sink 522a includes a plurality of fins 522b, which are disposed in the interior of the circulation duct 25, and a plurality of fins 522c, which are disposed in the exterior of the circulation duct 25.

Exhaust air EA exhausted from the light source device 2 and guided through an exhaust duct 2a is sprayed to the plurality of fins 522c. The heat sink 522a is thus heated by the heat from the light source device 2. When the heat sink 522a is heated, the fins 522b disposed in the circulation duct 25 radiate heat, which can heat the air AR2 in the circulation duct 25. The heated air AR2 is delivered by the second air blower 23 to a portion of the moisture absorbing/discharging member 40 that is the portion located in the second region F2. The heater 522 heats a portion of the moisture absorbing/discharging member 40 that is the portion located in the second region F2 by using the heat from the light source device 2.

According to the present embodiment, in which the heat from the light source device 2 can be used, no energy needs to be separately supplied to heat the moisture absorbing/discharging member 40. The electric power consumed by the refrigerant generator 520 can therefore be reduced.

Further, according to the present embodiment, the heat sink 522a is so provided as to be present both in the interior and the exterior of the circulation duct 25. The exhaust air EA from the light source device 2 can therefore be sprayed to the heat sink 522a from the exterior of the circulation duct 25 to readily heat the heat sink 522a. The heat from the light source device 2 can therefore be readily used to heat the air AR2 in the circulation duct 25, and the heated air AR2 can be delivered by the second air blower 23 to heat the moisture absorbing/discharging member 40.

Variation 1 of Third Embodiment

Figure 16:
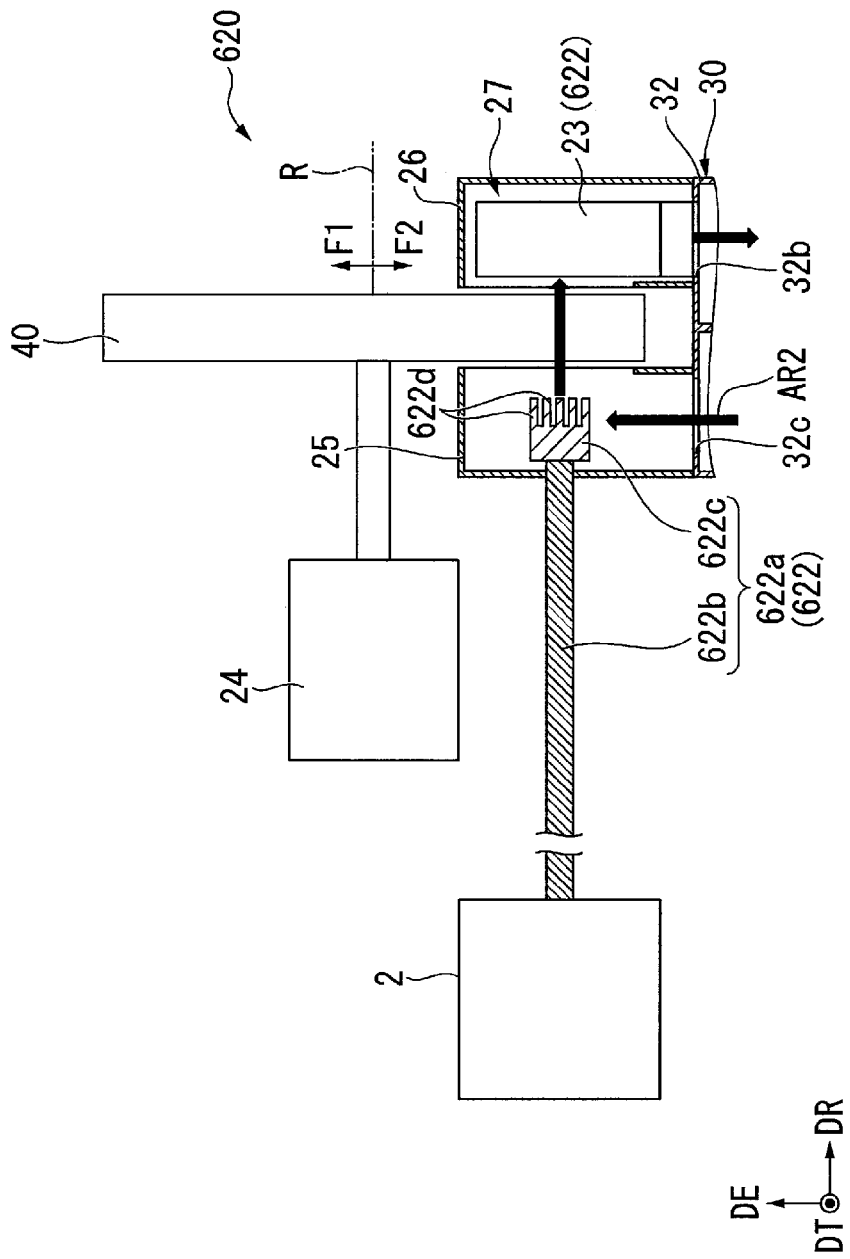
FIG. 16 diagrammatically shows part of a refrigerant generator according to Variation 1 of the third embodiment.

FIG. 16 diagrammatically shows part of a refrigerant generator 620 according to the present variation. In the refrigerant generator 620 according to the present variation, a heater 622 includes a heating main body 622a and the second air blower 23, as shown in FIG. 16. The heating main body 622a includes a heat pipe 622b and a heat sink 622c. The heat pipe 622b is connected to the light source device 2. An end portion of the heat pipe 622b that is the portion on the side (right in FIG. 16) opposite the side connected to the light source device 2 passes through the wall of the circulation duct 25 and is disposed in the circulation duct 25. The heat sink 622c is provided at an end of the heat pipe 622b that is the end disposed in the circulation duct 25. The heat sink 622c has a plurality of fins 622d.

According to the present variation, the heat pipe 622b transfers heat from the light source device 2 to the interior of the circulation duct 25. Using the heat from the light source device 2 to heat the air AR2 in the circulation duct 25 and delivering the heated air AR2 via the second air blower 23 therefore allows the moisture absorbing/discharging member 40 to be heated. The electric power consumed by the refrigerant generator 620 can therefore be reduced.

Further, according to the present variation, the heat sink 622c is provided at an end of the heat pipe 622b. The heat transferred from the light source device 2 to the heat pipe 622b is therefore readily radiated via the fins 622d of the heat sink 622c into the air AR2 in the circulation duct 25.

Variation 2 of Third Embodiment

Figure 17:
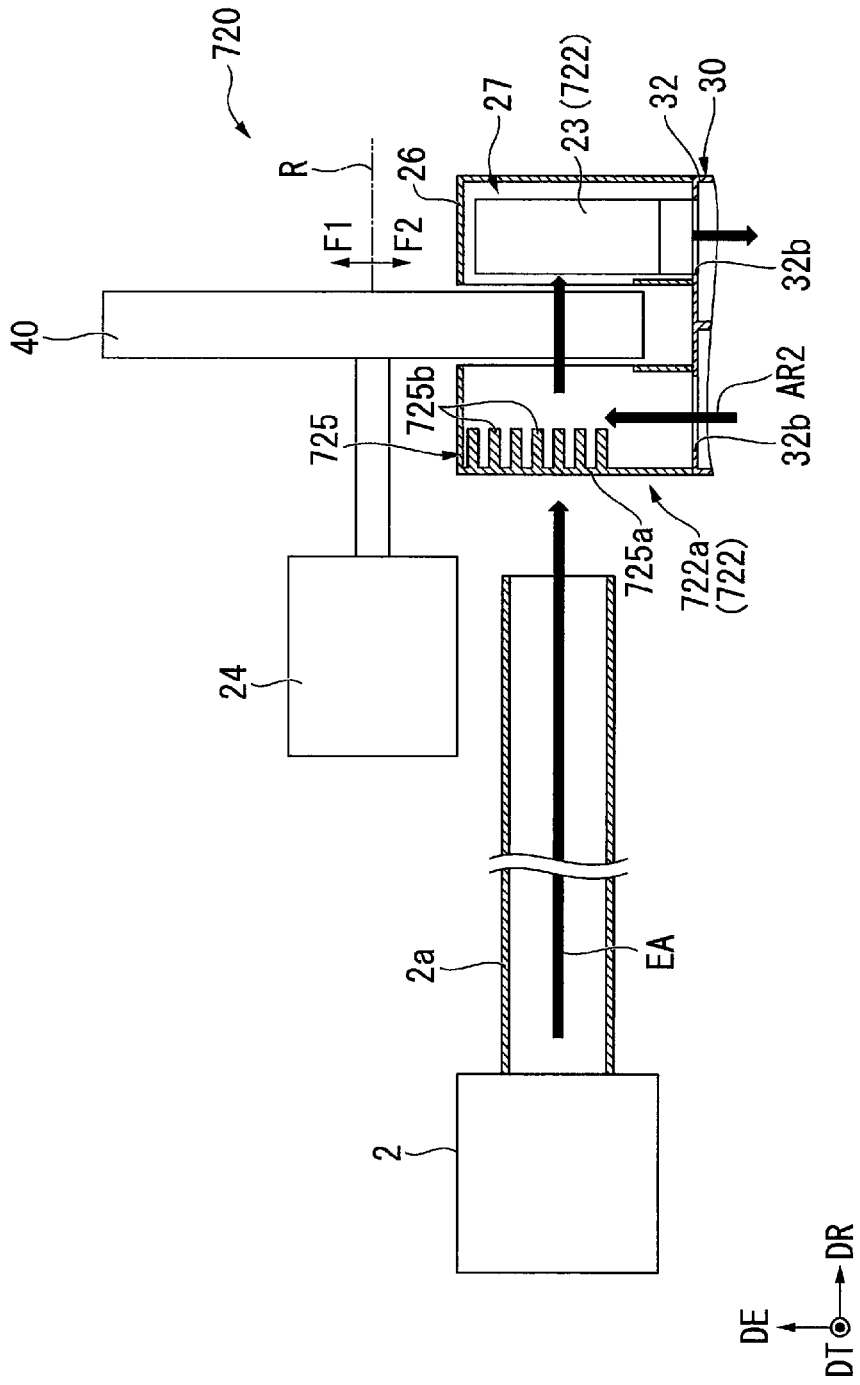
FIG. 17 diagrammatically shows part of a refrigerant generator according to Variation 2 of the third embodiment.

FIG. 17 diagrammatically shows part of a refrigerant generator 720 according to the present variation. In the refrigerant generator 720 according to the present variation, a circulation duct (first duct) 725 includes a metal section 725a made of a metal, as shown in FIG. 17. In the present variation, for example, the circulation duct 725 is entirely formed of the metal section 725a.

A heater 722 includes a heating main body 722a and the second air blower 23. The heating main body 722a includes the metal section 725a and a plurality of fins 725b, which protrude from the inner surface of the metal section 725a, that is, the inner surface of the circulation duct 725. The exhaust air EA from the light source device 2 is sprayed to the metal section 725a from the exterior of the circulation duct 725. The metal section 725a is thus heated by the heat from the light source device 2.

According to the present variation, the exhaust air EA from the light source device 2 can heat the metal section 725a to heat the air AR2 in the metal section 725a, that is, in the circulation duct 725. Using the heat from the light source device 2 to heat the air AR2 in the circulation duct 725 and delivering the heated air AR2 via the second air blower 23 therefore allows the moisture absorbing/discharging member 40 to be heated. The electric power consumed by the refrigerant generator 720 can therefore be reduced.

Further, according to the present variation, in which the heater 722 does not need to be so provided as to pass through the wall of the circulation duct 725, a decrease in the hermeticity of the circulation path 27 can be avoided. Further, since the fins 725b are provided on the inner surface of the metal section 725a, the heat from the heated metal section 725a is readily radiated into the air AR2 in the circulation duct 725.

The circulation duct 725 may instead be so configured that only part thereof is the metal section made of a metal. Still instead, another portion that forms the circulation path 27 may be made of a metal, or the entire portion that forms the circulation path 27 may be made of a metal.

Fourth Embodiment

Figure 18:
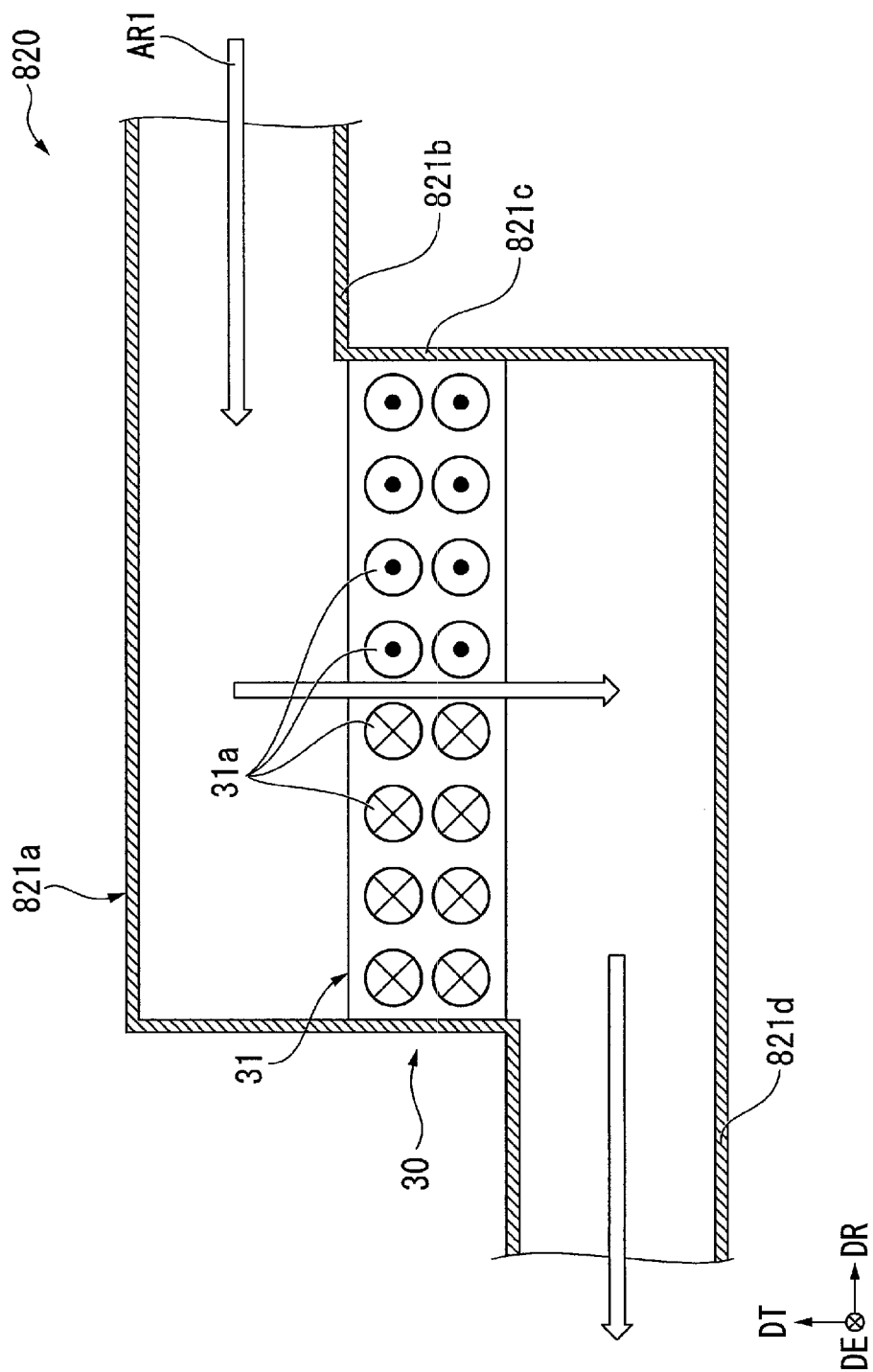
FIG. 18 diagrammatically shows part of a refrigerant generator according to a fourth embodiment.

A fourth embodiment differs from the first embodiment in terms of the method for cooling the flow passage section 31. It is noted that configurations similar to those described above, for example, have the same reference characters as appropriate, and that no description thereof will therefore be made in some cases. FIG. 18 diagrammatically shows part of a refrigerant generator 820 according to the present embodiment.

In the refrigerant generator 820 according to the present embodiment, a cooling passage 821a has a first section 821b, a second section 821c, and a third section 821d, as shown in FIG. 18. The first section 821b and the third section 821d extend in the rotational axis direction DR. The second section 821c extends in the thickness direction DT. The first section 821b is connected to the upper end of the second section 821c. The third section 821d is connected to the lower end of the second section 821c. The flow passage section 31 is provided in the second section 821c.

The air AR1 flowing through the first section 821b in the rotational axis direction DR then flows through the second section 821c in the thickness direction DT and passes by the flow passage section 31. The air AR1 then flows through the third section 821d in the rotational axis direction DR. The direction in which the air AR1 flows through the first section 821b is, for example, the same as the direction in which the air AR1 flows through the third section 821d.

The direction in which the flow passage section 31 has the smallest dimension out of the directions that intersect the extension direction DE is the thickness direction DT. That is, in the present embodiment, the flow passage section 31 is cooled by the air (medium) AR1 flowing in the thickness direction DT, which is the direction in which the flow passage section 31 has the smallest dimension out of the directions that intersect the extension direction DE. Therefore, according to the present embodiment, the distance over which the air AR1 passing by the flow passage section 31 travels can be shortened. An excessive increase in the temperature of the air AR1 passing by the flow passage section 31 can therefore avoided, whereby the entire flow passage section 31 can be efficiently cooled. The refrigerant W can therefore be efficiently generated in the flow passage section 31.

Figure 19:
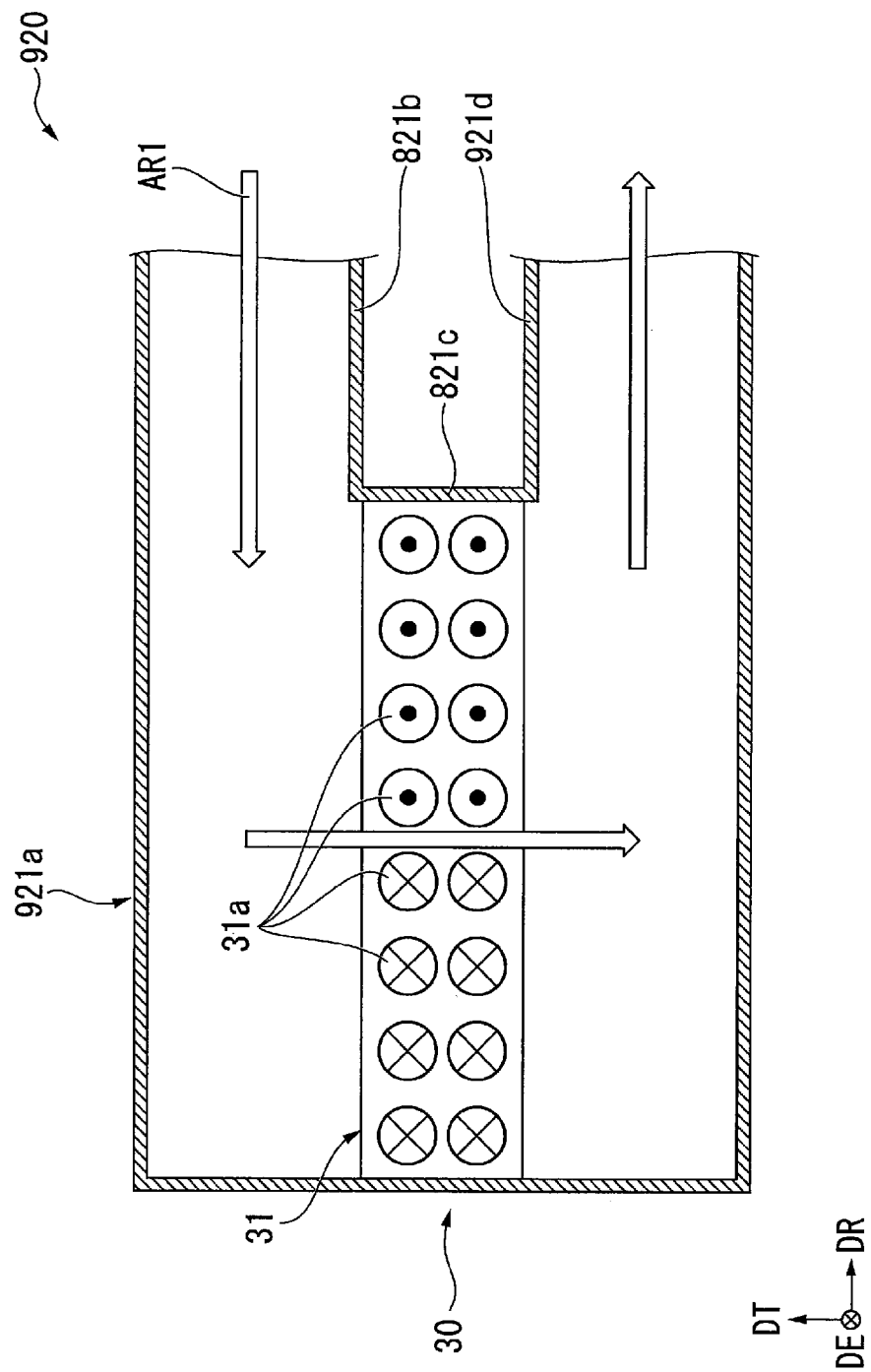
FIG. 19 diagrammatically shows part of a refrigerant generator according to variative of the fourth embodiment.

The third section 821d may instead be configured as shown in FIG. 19. FIG. 19 diagrammatically shows part of a refrigerant generator 920. In a cooling passage 921a, the direction in which the air AR1 flows through a third section 921d is opposite the direction in which the air AR1 flows through the first section 821b, as shown in FIG. 19.

Fifth Embodiment

Figure 20:
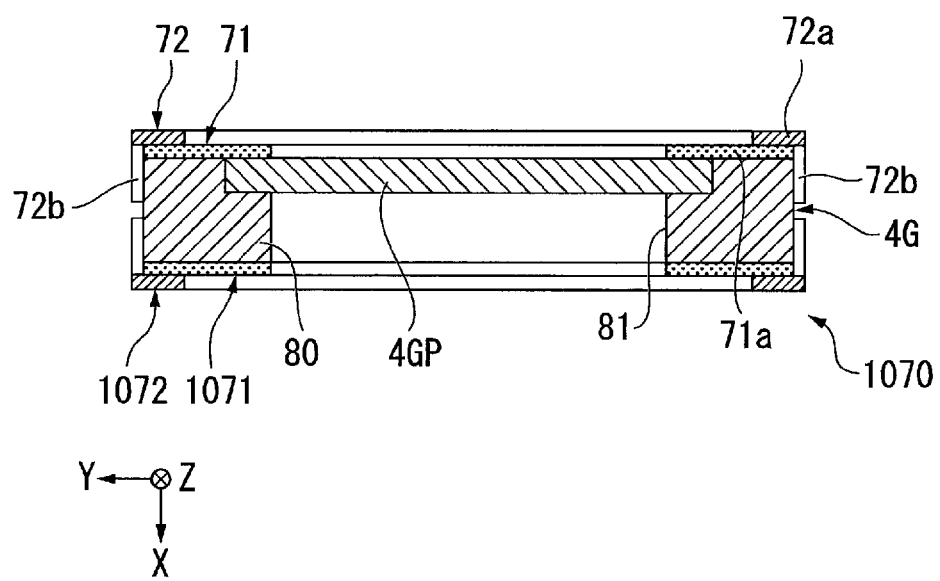
FIG. 20 is a cross-sectional view showing a cooling facilitator according to a fifth embodiment.

A fifth embodiment differs from the first embodiment in terms of the configuration of the cooling facilitator. It is noted that configurations similar to those described above, for example, have the same reference characters as appropriate, and that no description thereof will therefore be made in some cases. FIG. 20 is a cross-sectional view showing a cooling facilitator 1070 in the present embodiment.

The cooling facilitator 1070 in the present embodiment further includes, in addition to the cooling facilitator 70 in the first embodiment, a refrigerant holder 1071 and fixing members 1072, as shown in FIG. 20. The refrigerant holder 1071 is provided on a surface of the holding frame 80 that is the surface facing the side toward which light exits from the light modulator 4GP (+x side).

The refrigerant holder 1071 has the same configuration as that of the refrigerant holder 71 except that the refrigerant holder 1071 is provided on a different surface. The fixing members 1072 have the same configuration as that of the fixing members 72 except that the fixing members 1072 fix the refrigerant holder 1071.

According to the present embodiment, the refrigerant holders are provided on a surface of the holding frame 80 that is the surface facing the side toward which light is incident on the light modulator 4GP and on a surface of the holding frame 80 that is the surface facing the side toward which light exits from the light modulator 4GP. An area of the cooling target that is the area where the refrigerant W vaporizes can therefore be increased, whereby the cooling target can be further cooled.

Variation 1 of Fifth Embodiment

Figure 21:
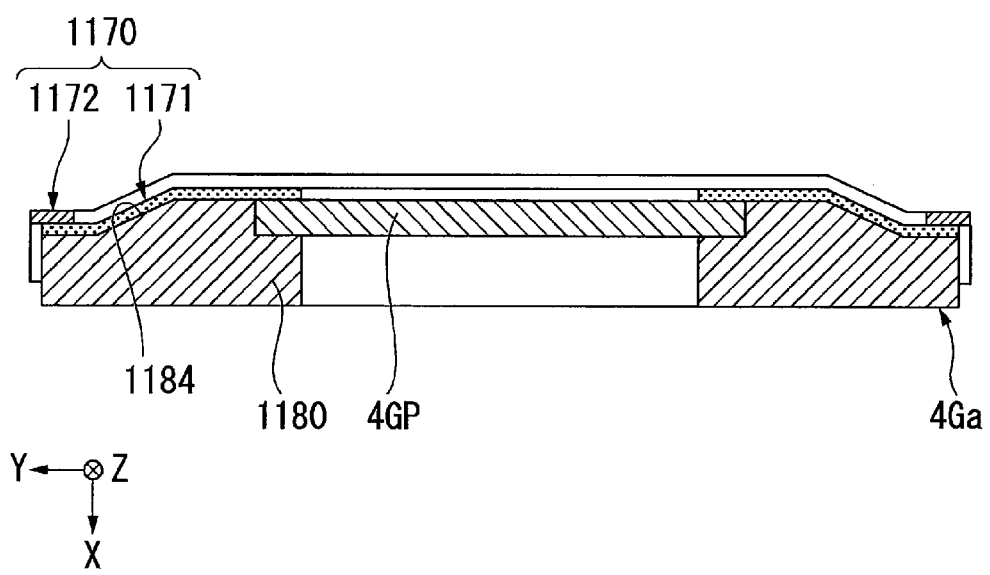
FIG. 21 is a cross-sectional view showing a cooling facilitator according to Variation 1 of the fifth embodiment.

FIG. 21 is a cross-sectional view showing a cooling facilitator 1170 in the present variation. In the present variation, a holding frame 1180, which holds a light modulation unit 4Ga, includes inclining sections 1184, as shown in FIG. 21. The inclining sections 1184 are provided on a side of the holding frame 1180 that is the side toward which light is incident on the light modulator 4GP (−X side). The inclining sections 1184 are provided in portions of the holding frame 1180 that are the opposite portions in the width direction Y. The inclining sections 1184 incline toward the side toward which light exits out of the light modulator 4GP (+X side) with distance from the inner edge of the holding frame 1180 toward the outer edge thereof.

A refrigerant holder 1171 and fixing members 1172 of the cooling facilitator 1070 are bent along the surface of the holding frame 1180 that is the surface facing the side toward which light is incident on the light modulator 4GP. As a result, even in a case where the surface of the holding frame 1180 has a protruding portion and a recessed portion, for example, the case where the inclining sections 1184 are provided as in the present variation, the refrigerant holder 1171 can be so fixed to the surface of the holding frame 1180 as to be in intimate contact therewith, whereby the light modulation unit 4Ga, which is the cooling target, is readily cooled.

Variation 2 of Fifth Embodiment

Figure 22:
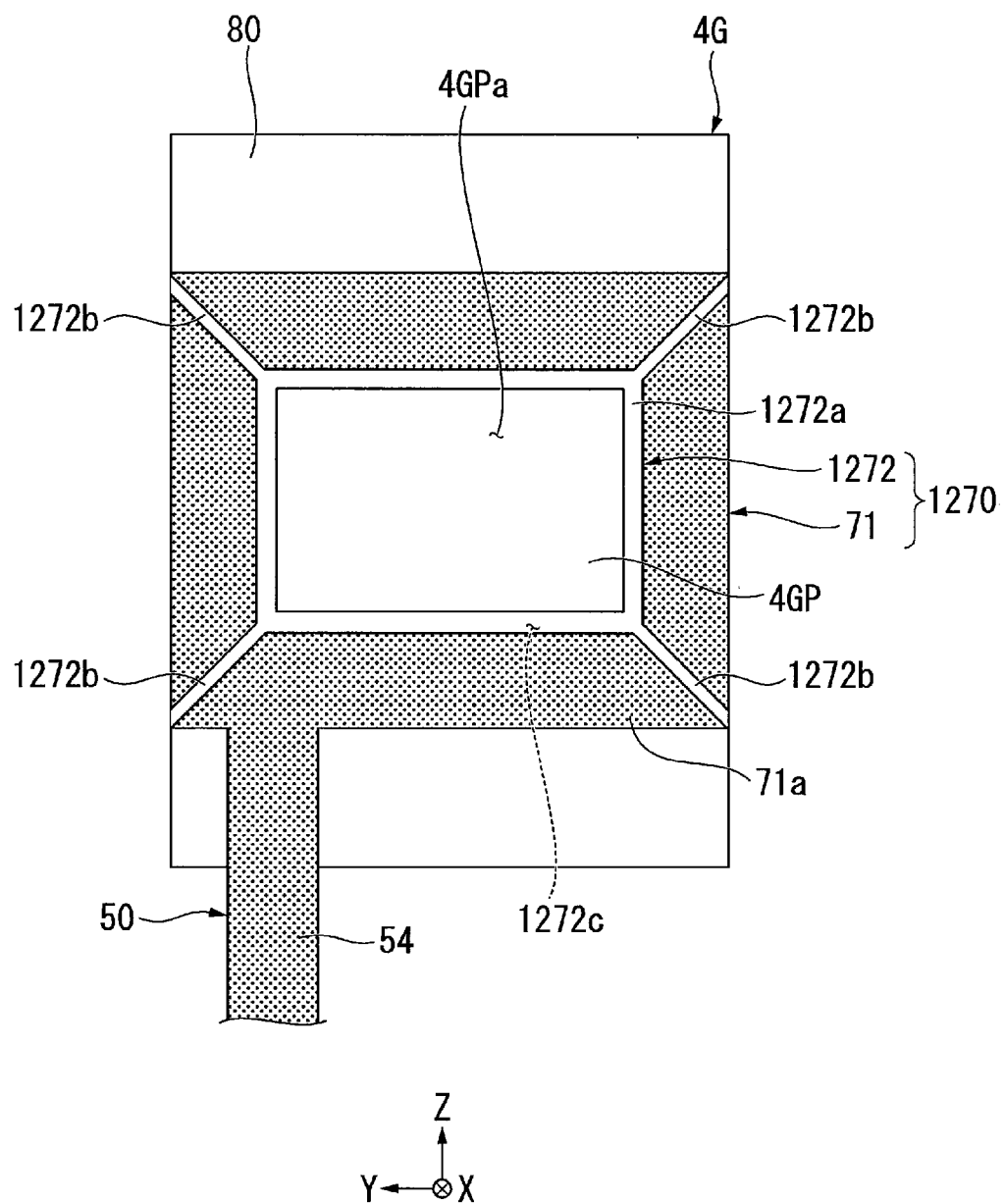
FIG. 22 shows a cooling facilitator according to Variation 2 of the fifth embodiment viewed from the side toward which light is incident on the light modulation unit.

FIG. 22 shows a cooling facilitator 1270 according to the present variation viewed from the side toward which light is incident on the light modulation unit 4G. In the cooling facilitator 1270 according to the present variation, a fixing member 1272 includes a frame section 1272a and arm sections 1272b, as shown in FIG. 22.

The frame section 1272a surrounds an edge portion of an image formation region 4GPa of the light modulator 4GP. The image formation region 4GPa is a portion of the light modulator 4GP that is the portion through which light passes and which modulates the light passing therethrough to form an image. The frame section 1272a has a rectangular-frame-like shape. The frame section 1272a and the holding frame 80 sandwich the refrigerant holder 71 in the layering direction. A light absorber 1272c, which absorbs light, is provided on a surface of the frame section 1272a that is the surface facing the refrigerant holder 71 (+X side).

The arm sections 1272b radially extend from the four corners of the frame section 1272a. Although not shown, the arm sections 1272b engage with protrusions provided on the side surface of the holding frame 80. The fixing members 1272 are thus fixed to the holding frame 80.

According to the present variation, the frame section 1272a, which surrounds the edge portion of the image formation region 4GPa, is provided. The frame section 1272a can prevent light, out of the light incident on the light modulator 4GP, reflected off a metal mask or any other component provided on an outer edge portion of the light modulator 4GP from returning to the light incident side (−X side) of the light modulator 4GP. The frame section 1272a can therefore prevent formation of noise in an image projected from the projector.

Further, according to the present variation, the light absorber 1272c is provided on a surface of the frame section 1272a that is the surface facing the refrigerant holder 71. The light absorber 1272c therefore absorbs the light reflected off the metal mask or any other component on the light modulator 4GP. The light absorber 1272c can therefore prevent formation of noise in an image projected from the projector.

Sixth Embodiment

Figure 23:
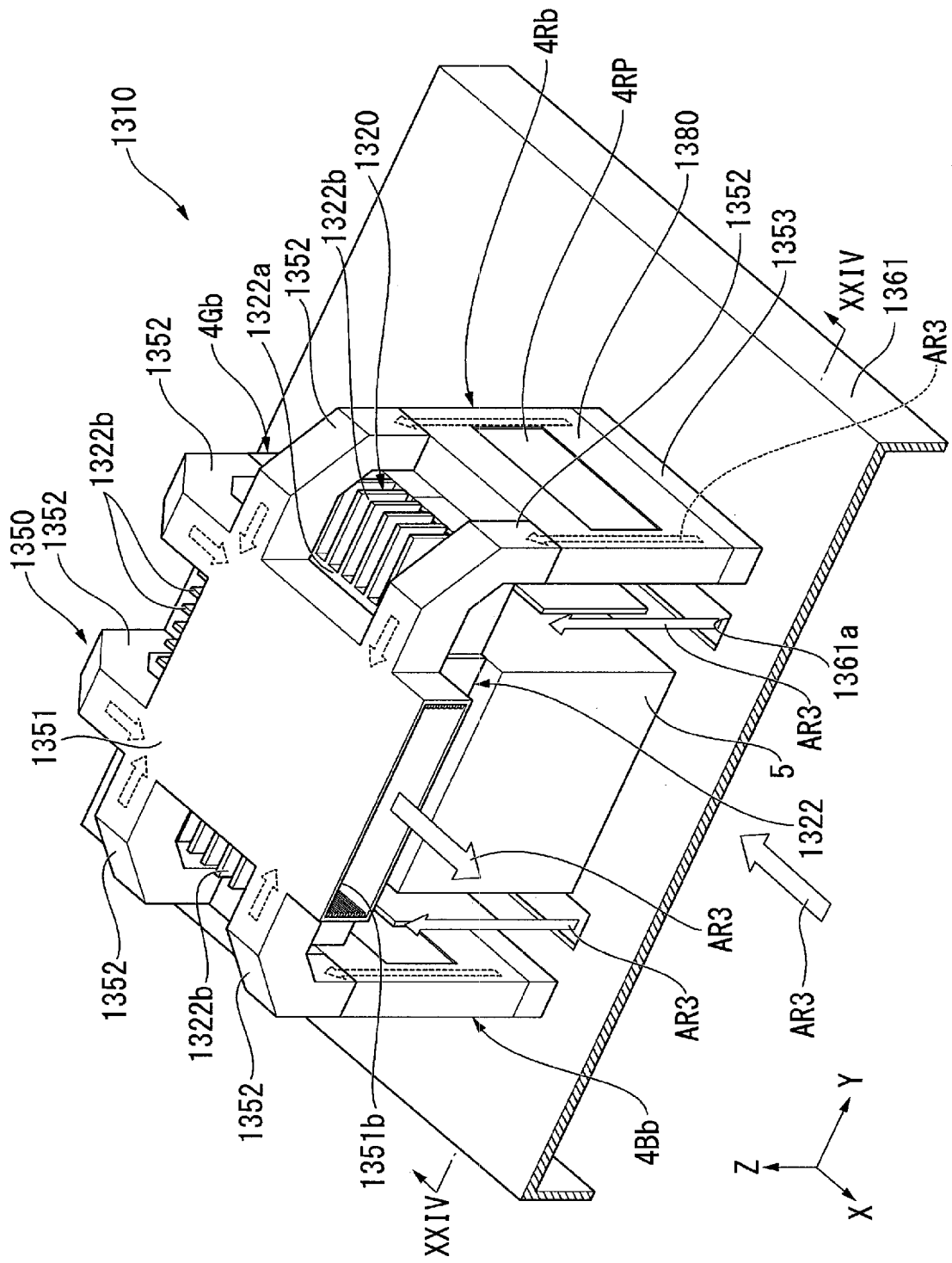
FIG. 23 is a perspective view showing part of a cooler according to a sixth embodiment.
Figure 24:
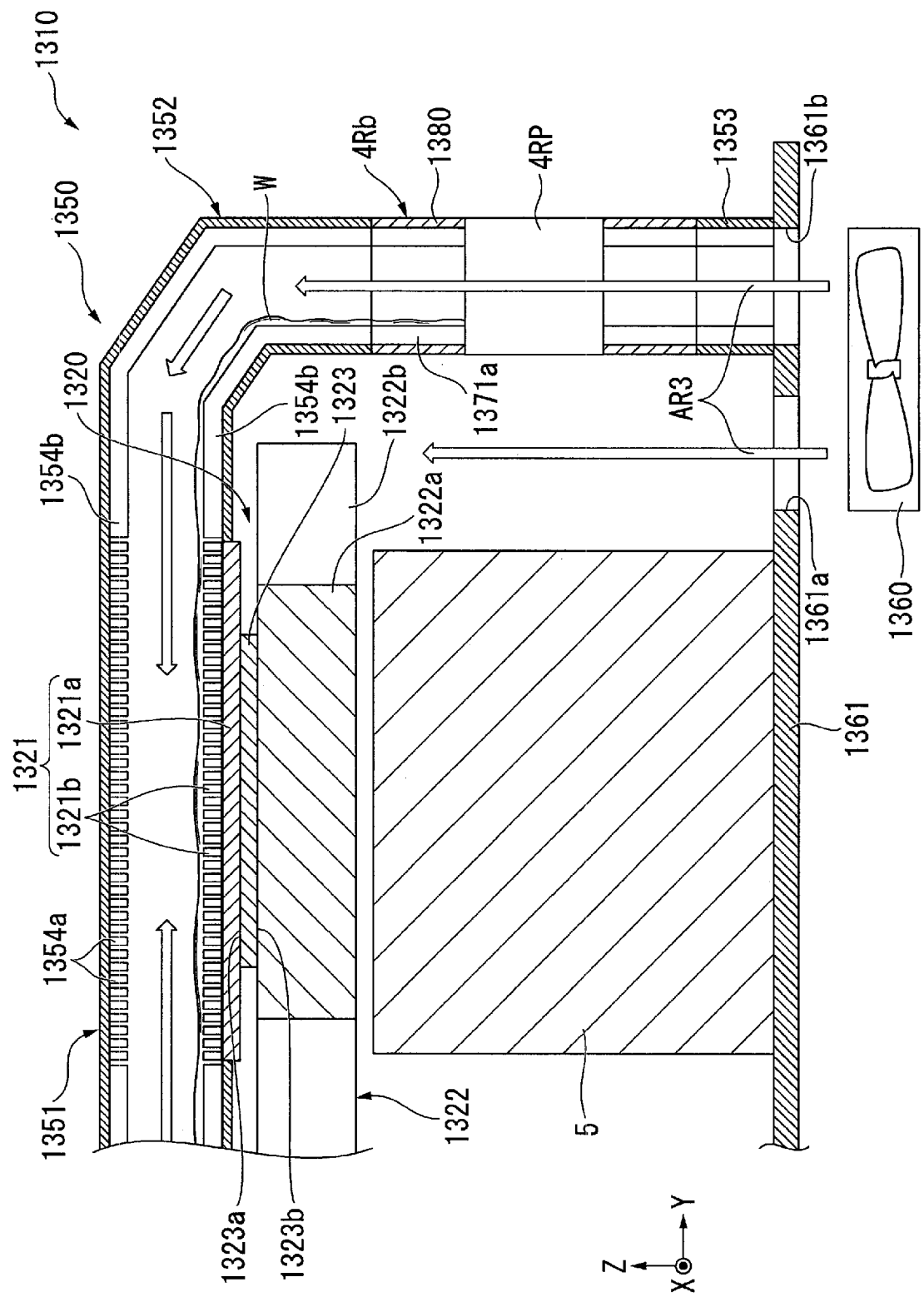
FIG. 24 is a cross-sectional view of the cooler according to the sixth embodiment taken along the line XXIV-XXIV in FIG. 23.
Figure 25:
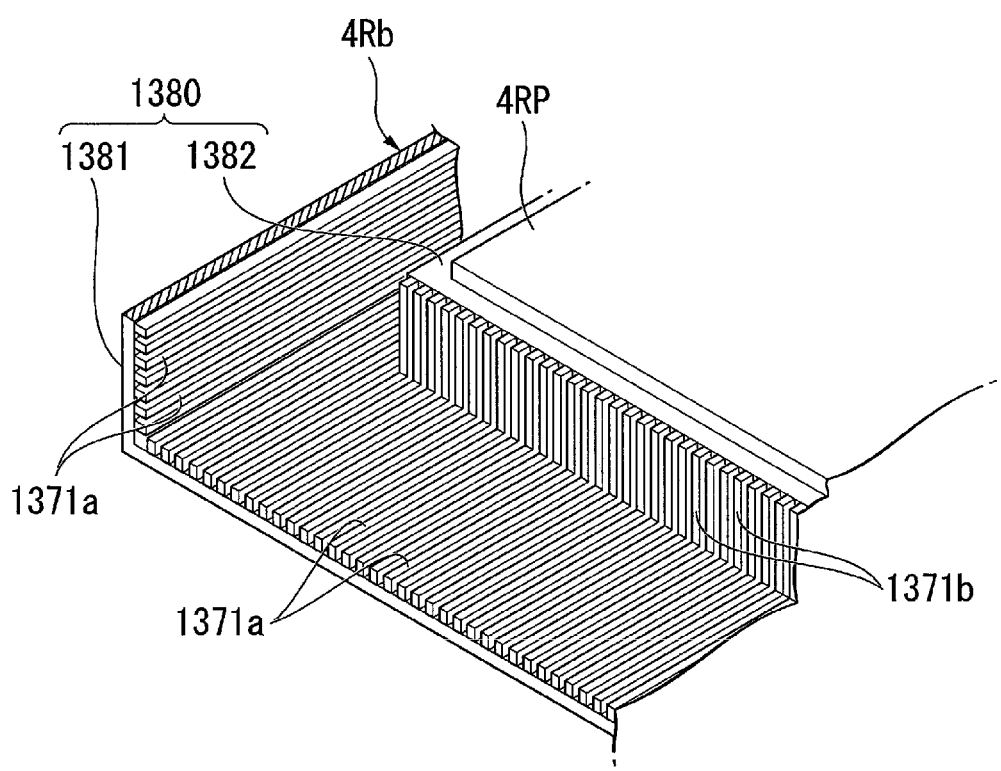
FIG. 25 is a partial cross-sectional perspective view showing a light modulation unit in the sixth embodiment.
Figure 26:
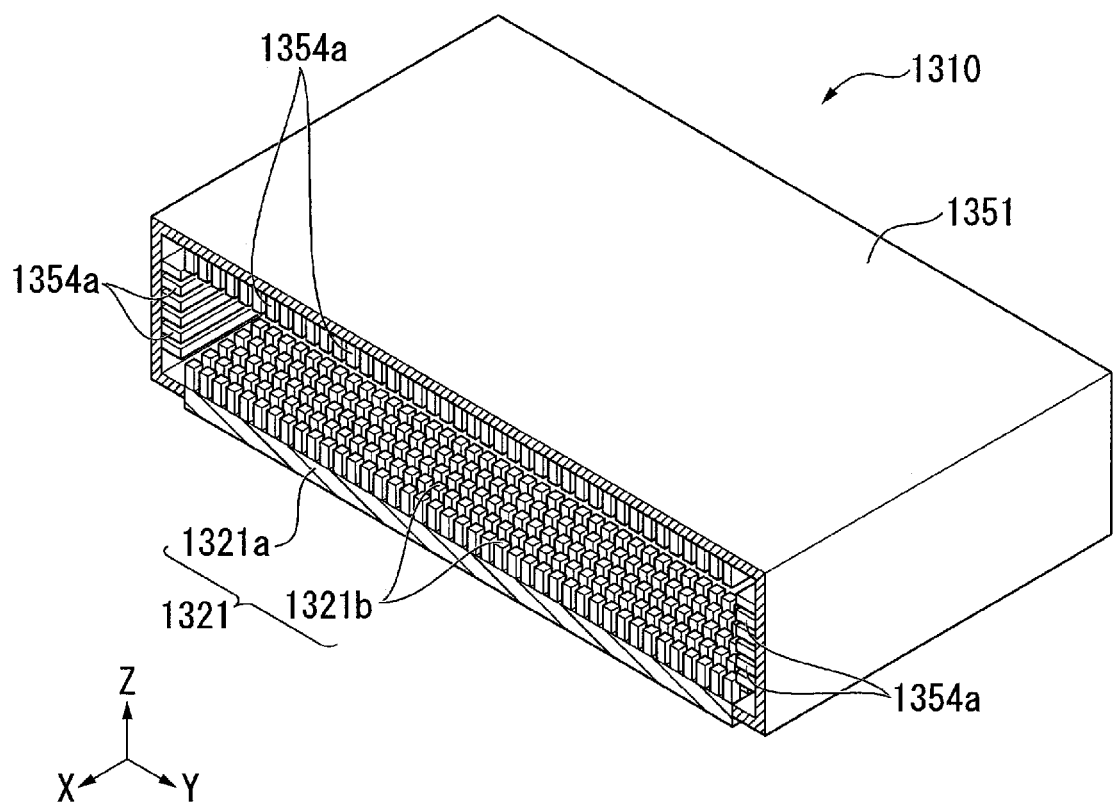
FIG. 26 is a partial cross-sectional perspective view showing part of the cooler according to the sixth embodiment.

A sixth embodiment differs from the first to fifth embodiments in terms of the principle in accordance with which the refrigerant generator generates the refrigerant W. It is noted that configurations similar to those described above, for example, have the same reference characters as appropriate, and that no description thereof will therefore be made in some cases. FIG. 23 is a perspective view showing part of a cooler 1310 according to the present embodiment. FIG. 24 is a cross-sectional view of the cooler 1310 according to the present embodiment taken along the line XXIV-XXIV in FIG. 23. FIG. 25 is a partial cross-sectional perspective view showing a light modulation unit 4Rb in the present embodiment. FIG. 26 is a partial cross-sectional perspective view showing part of the cooler 1310 according to the present embodiment.

Light modulation units 4Rb, 4Gb, and 4Bb and the light combining system 5 in the present embodiment are disposed on the upper surface of a duct 1361, as shown in FIG. 23. In the present embodiment, the light modulation units 4Rb, 4Gb, and 4Bb are each the cooling target. The arrangement of the light modulation units 4Rb, 4Gb, and 4Bb and the light combining system 5 is the same as the arrangement in the first embodiment. The light modulation units 4Rb, 4Gb, and 4Bb have the same structure except that they are disposed in different positions and take different attitudes, and only the light modulation unit 4Rb will therefore be representatively described below in some cases.

The light modulation unit 4Rb is fixed onto the upper surface of the duct 1361 via a spacer 1353. The spacer 1353 is a rectangular-frame-shaped member, as shown in FIGS. 23 and 24. The interior of the spacer 1353 is continuous with the interior of the duct 1361 via a through hole 1361b provided in the upper surface of the duct 1361.

The light modulation unit 4Rb includes a holding frame (first holder) 1380. The holding frame 1380 is hollow, as shown in FIGS. 24 and 25. The holding frame 1380 includes a rectangular tubular section 1381 and a holding section 1382, as shown in FIG. 25. The rectangular tubular section 1381 has a rectangular tubular shape that opens at opposite sides in the upward/downward direction Z. A plurality of refrigerant holders 1371a are provided on the inner surface of the rectangular tubular section 1381. The refrigerant holders 1371a protrude from the inner surface of the rectangular tubular section 1381. The refrigerant holders 1371a extend in the upward/downward direction Z. The plurality of refrigerant holders 1371a are arranged along the entire inner surface of the rectangular tubular section 1381 at minute intervals.

The holding section 1382 has a rectangular-frame-like shape and is disposed at the center in the rectangular tubular section 1381. The holder 1382 holds the light modulator 4RP therein. The holding frame 1380 thus holds the light modulator 4RP. A plurality of refrigerant holders 1371b are provided on the outer surface of the holding section 1382. The refrigerant holders 1371b protrude from the outer surface of the holding section 1382. The refrigerant holders 1371b extend in the direction in which light is incident on the light modulator 4RP. The plurality of refrigerant holders 1371b are arranged along the entire outer surface of the holding section 1382 at minute intervals. Ends of each of the refrigerant holders 1371b that are the ends in the extending direction are connected to the corresponding refrigerant holders 1371a provided on the rectangular tubular section 1381.

In the cooler 1310 according to the present embodiment, a refrigerant generator 1320 is disposed above the light combining system 5, as shown in FIGS. 23 and 24. The refrigerant generator 1320 includes a thermoelectric device 1323, a first heat exchanger 1321, a second heat exchanger 1322, and a third air blower 1360.

The thermoelectric device 1323 is a plate-shaped device with the principal surfaces thereof perpendicular to the upward/downward direction Z, as shown in FIG. 24. The thermoelectric device 1323 is a Peltier device. The thermoelectric device 1323 has a heat absorbing surface 1323a and a heat radiating surface 1323b. In the present embodiment, the heat absorbing surface 1323a is the upper surface of the thermoelectric device 1323. The heat radiating surface 1323b is the lower surface of the thermoelectric device 1323. The thermoelectric device 1323, when electricity is supplied thereto, absorbs heat via the heat absorbing surface 1323a and radiates the heat via the heat radiating surface 1323b.

The first heat exchanger 1321 includes a plate-shaped plate section 1321a, which the principal surfaces thereof are perpendicular to the upward/downward direction Z, and a plurality of protruding sections 1321b, which protrude upward from the upper surface of the plate section 1321a. The plate section 1321a is fixed to the heat absorbing surface 1323a of the thermoelectric device 1323. The first heat exchanger 1321 is thus connected to the heat absorbing surface 1323a. The plurality of protruding sections 1321b are arranged across the upper surface of the plate section 1321a at minute intervals along the optical axis direction X and the width direction Y, as shown in FIG. 26.

The second heat exchanger 1322 is a heat sink. The second heat exchanger 1322 includes a base 1322a, which has the shape of a rectangular parallelepiped, and a plurality of fins 1322b, as shown in FIG. 24. The base 1322a is fixed to the heat radiating surface 1323b of the thermoelectric device 1323. The second heat exchanger 1322 is thus connected to the heat radiating surface 1323b. As shown in FIG. 23, the plurality of fins 1322b protrude from the base 1322a toward the sides where the light modulation units 4Rb, 4Gb, and 4Bb are disposed, that is, the opposite sides in the width direction Y and the light incident side in the optical axis direction X (−X side).

The third air blower 1360 shown in FIG. 24 is, for example, an intake fan that takes outside air into the projector. Air AR3 exhausted from the third air blower 1360 passes through the duct 1361. The air AR3 flows into the holding frame 1380 in the light modulation unit 4Rb via the through hole 1361b. The third air blower 1360 thus cools the light modulation unit 4Rb, which is the cooling target.

The air AR3 is exhausted out of the duct 1361 via a through hole 1361a provided in the upper surface of the duct 1361. The through hole 1361a is disposed between the light modulation unit 4Rb and the light combining system 5 in the width direction Y. The air AR3 exhausted out of the duct 1361 via the through hole 1361a is sprayed to the fins 1322b in the second heat exchanger 1322. The third air blower 1360 thus cools the second heat exchanger 1322.

When the second heat exchanger 1322 is cooled and the temperature thereof therefore decreases, the amount of heat that the thermoelectric device 1323 transfers from the heat absorbing surface 1323a to the heat radiating surface 1323b can be increased. The temperature of the first heat exchanger 1321 connected to the heat absorbing surface 1323a therefore greatly decreases, whereby water vapor contained in the air around the first heat exchanger 1321 condenses into the refrigerant W. The first heat exchanger 1321 thus condenses the water vapor in the air to generate the refrigerant W.

In the cooler 1310 in the present embodiment, a refrigerant sender 1350 includes a sending duct (second duct) 1351 and connecting ducts (second duct) 1352. The sending duct 1351 is a box-like rectangular parallelepiped that opens toward the light exiting side (+X side) in the optical axis direction X, as shown in FIG. 23. The sending duct 1351 is disposed above the light combining system 5. The sending duct 1351 is located above the light modulation units 4Rb, 4Gb, and 4Bb. The first heat exchanger 1321 passes through and is fixed to the lower wall of the sensed duct 1351, as shown in FIG. 24. The first heat exchanger 1321 is thus disposed in the sending duct 1351. The first heat exchanger 1321 is connected to the refrigerant sender 1350. The thermoelectric device 1323 and the second heat exchanger 1322 are disposed in the exterior of the sending duct 1351.

A plurality of protruding sections 1354a are arranged on the inner surface of the sending duct 1351, as shown in FIG. 26. The plurality of protruding sections 1354a are provided on following ones of the inner surfaces of the sending duct 1351: the surfaces on opposite sides in the width direction Y; the upper surface; and the surface facing the light incident side in the optical axis direction X (−X side). The plurality of protruding sections 1354a provided on the surface facing the light incident side in the optical axis direction X out of the inner surfaces of the sending duct 1351 extend in the optical axis direction Y. The protruding sections 1354a are arranged on each of the surfaces where they are provided at minute intervals in the direction perpendicular to the direction in which the protruding sections 1354a extend.

The connecting ducts 1352 are formed of six connecting ducts 1352 in total and extend from side surfaces of the sending duct 1351 that are parallel to the upward/downward direction Z; two of the six connecting ducts 1352 extend toward the light modulation unit 4Rb, another two of the six connecting ducts 1352 extend toward the light modulation unit 4Gb, and the remainder of the six connecting ducts 1352 extend toward the light modulation unit 4Bb, as shown in FIG. 23. The connection ducts 1352 allow the interior of the sending duct 1351 to continuous with the interior of the holding frame 1380 in each of the light modulation units 4Rb, 4Gb, and 4Bb, as shown in FIG. 24. The interior of the sending duct 1351 and the interior of the connecting ducts 1352 communicate with the interior of the holding frames 1380. The connecting ducts 1352 protrude from the side surfaces of the sending duct 1351 that are perpendicular to the upward/downward direction Z in the direction perpendicular to the side surfaces, then are bent twice downward and oriented directly below, and are connected to the upper ends of the holding frames 1380.

Figure 27:
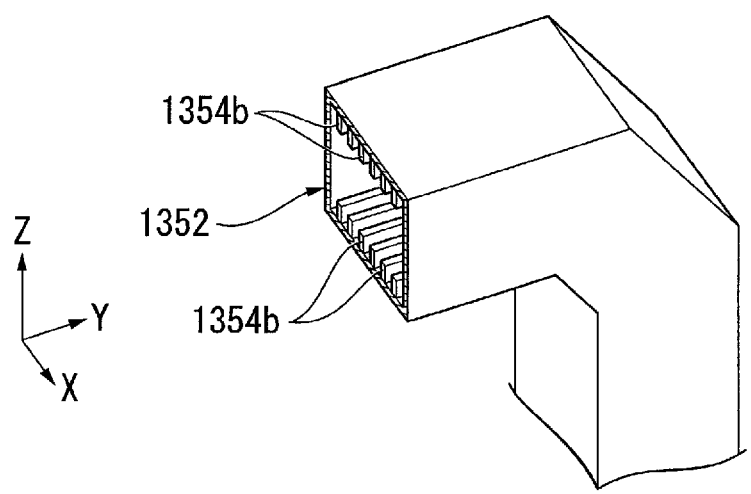
FIG. 27 is a partial cross-sectional perspective view showing part of a connection duct in the sixth embodiment.

FIG. 27 is a partial cross-sectional perspective view showing part of one of the connection ducts 1352. A plurality of protruding sections 1354b are arranged on the inner surface of each of the connection ducts 1352. The protruding sections 1354b are provided on the surfaces on opposite sides in the upward/downward direction Z out of the inner surfaces of each of the connecting ducts 1352. The protruding section 1354b extend in the direction in which the connecting ducts 1352 extend, as shown in FIG. 24. The plurality of protruding sections 1354b are arranged on each of the surfaces where they are provided at minute intervals in the direction perpendicular to the direction in which the protruding sections 1354b extend.

In the present embodiment, the refrigerant sender 1350 sends the refrigerant W based on capillarity that occurs in the gaps between the plurality of protruding sections 1354a and between the plurality of protruding sections 1354b. The refrigerant W generated by the refrigerant generator 1320 is sent from the protruding sections 1321b in the first heat exchanger 1321 directly to the protruding sections 1354b in the connecting ducts 1352 and from the protruding sections 1321b to the protruding sections 1354b in the connecting ducts 1352 via the protruding sections 1354a in the sending duct 1351. The refrigerant W is then sent via the protruding sections 1354b into the holding frames 1380. The refrigerant sender 1350 thus sends the refrigerant W into the holding frames 1380 via the sending duct 1351 and the connecting ducts 1352.

Since the air AR3 delivered from the third air blower 1360 flows into the holding frames 1380, the air AR3 facilitates vaporization of the refrigerant W having flowed into the holding frames 1380. The air AR3 delivered from the third air blower 1360 is delivered from the interior of the holding frames 1380 into the connecting ducts 1352 and the sending duct 1351 and exhausted via the opening of the sending duct 1351, as shown in FIG. 23.

According to the present embodiment, the refrigerant W generated by the refrigerant generator 1320 can be sent by the refrigerant sender 1350 to the light modulation units 4Rb, 4Gb, and 4Bb, which are each the cooling target. The cooler 1310 can thus cool the cooling target based on vaporization of the refrigerant W. Therefore, according to the present embodiment, the projector provided with the cooler 1310 which is excel in cooling performance, have a compact size, and excel in quietness can be obtained, as in the embodiment described above.

In the present embodiment, the air AR3 can cool the second heat exchanger 1322, to which the thermoelectric device 1323 is attached, to generate the refrigerant W from the atmosphere around the thermoelectric device 1323. The one third air blower 1360 only therefore needs to be provided as an air blower necessary for the generation of the refrigerant W. The number of air blowers can therefore be reduced, whereby the quietness of the projector can be further improved.

According to the present embodiment, the third air blower 1360 cools the light modulation units 4Rb, 4Gb, and 4Bb, which are each the cooling target. The light modulation units 4Rb, 4Gb, and 4Bb, which are each the cooling target, can therefore be further cooled. Further, the third air blower 1360 can deliver the air AR3 to the light modulation units 4Rb, 4Gb, and 4Bb, which are each the cooling target, to facilitate the vaporization of the refrigerant W. The light modulation units 4Rb, 4Gb, and 4Bb, which are each the cooling target, can therefore be further cooled.

According to the present embodiment, the holding frames 1380 are each hollow, and the refrigerant sender 1350 sends the refrigerant W into the holding frames 1380 via the sending duct 1351 and the connecting ducts 1352. The configuration described above can prevent the evaporated refrigerant W from flowing along the optical paths of the light modulators 4RP, 4GP, and 4BP in the light modulation units 4Rb, 4Gb, and 4Bb, which are each the cooling target. The configuration described above can thus prevent the light modulators 4RP, 4GP, and 4BP from being fogged and can therefore prevent formation of noise in an image projected from the projector.

According to the present embodiment, the air AR3 delivered from the third air blower 1360 is delivered from the interior of the holding frames 1380 to the connecting ducts 1352 and the sending duct 1351. The air AR3 can therefore cause the vaporized refrigerant W to return to the refrigerant sender 1350. Part of the vaporized refrigerant W having returned to the refrigerant sender 1350 condenses again into the refrigerant W, which is delivered to the holding frames 1380 in the light modulation units 4Rb, 4Gb, and 4Bb, which are each the cooling target. The thus generated refrigerant W can therefore be used again, whereby the cooling efficiency can be improved. Part of the vaporized refrigerant W is exhausted along with the air AR3 via the opening of the sending duct 1351.

According to the present embodiment, the first heat exchanger 1321 is disposed in the sending duct 1351. The refrigerant W generated by condensation of water vapor in the first heat exchanger 1321 is therefore readily sent by the refrigerant sender 1350.

According to the present embodiment, the second heat exchanger 1322 is disposed in the exterior of the sending duct 1351 and the connecting ducts 1352. The air AR3 delivered from the third air blower 1360 is therefore readily sprayed to the second heat exchanger 1322, whereby the second heat exchanger 1322 is readily cooled.

According to the present embodiment, the plurality of protruding sections 1354a and 1354b are provided in the sending duct 1351 and the connecting ducts 1352, and the refrigerant sender 1350 sends the refrigerant W based on capillarity that occurs in the gaps between the plurality of protruding sections 1354a and between the plurality of protruding sections 1354b. No pump or any other power source for sending the refrigerant W therefore needs to be separately provided. An increase in the number of parts of the projector can therefore be avoided, whereby the size and weight of the projector are readily reduced.

According to the present embodiment, the plurality of refrigerant holders 1371a and 1372b are arranged at intervals. The refrigerant W can therefore be held between the refrigerant holders 1371a and between the refrigerant holders 1372b. The generated refrigerant W can thus be readily used with no waste, whereby the cooling efficiency can be improved. Further, the refrigerant holders 1371a, which are so shaped as to extend in one direction, as in the present embodiment, can also guide the refrigerant W in a desired direction. That is, in the present embodiment, the refrigerant W having flowed through the connecting ducts 1352 into the holding frames 1380 can be delivered in the upward/downward direction Z, in which the refrigerant holders 1371a extend, to the surroundings around the light modulators 4RP, 4GP, and 4BP.

In the present embodiment, the first heat exchanger 1321 and the thermoelectric device 1323 may be disposed in the sending duct 1351. The second heat exchanger 1322 may also be disposed in the sending duct 1351.

In the present embodiment, a porous member may instead be used to send the refrigerant W, as in the first to fifth embodiments described above.

The configuration of the refrigerant generator is not limited to the configuration in each of the embodiments described above. The refrigerant generator does not necessarily have a specific configuration and may have any configuration that allows generation of the refrigerant. For example, the refrigerant generator may include a fuel cell, such as a hydrogen cell. In this case, for example, water generated by the fuel cell when electric power is supplied to the projector can be used as the refrigerant. The refrigerant is not limited to a specific medium and may be any non-water medium capable of cooling the cooling target. The refrigerant to be generated is not limited to a liquid and may, for example, be a solid. In this case, the solid refrigerant may change to a liquid while the refrigerant is sent to the cooling target or may be sent in the form of the solid to the cooling target. In the case where the refrigerant is sent in the form of the solid to the cooling target, the refrigerant may be sublimated directly into a gas to cool the cooling target or may be melted and changed to a liquid, which then vaporizes to cool the cooling target.

The configuration of the refrigerant sender is not limited to the configuration in the embodiments described above. The refrigerant sender does not necessarily have a specific configuration and may have any configuration that can send the refrigerant to the cooling target. The refrigerant sender may include a pump that sends the refrigerant and a pipe through which the refrigerant sent by the pump passes. The refrigerant sender may still instead send the refrigerant to the cooling target, for example, by using gravity.

The configuration of the cooling facilitators is not limited to the configuration in the embodiments described above. The cooling facilitators do not necessarily have a specific configuration and may have any configuration that can facilitate the cooling of the cooling target performed by the refrigerant sent to the cooling target. For example, the refrigerant holder of each of the cooling facilitators may be minute protruding portions and recessed portions formed in the surface of the cooling target, for example, by processing the surface. In this case, the protruding portions and the recessed portions hold the refrigerant. Still instead, the refrigerant holders may, for example, each be a hydrophilic coating provided on the surface of the cooling target.

The heater in the first to fifth embodiments does not necessarily have the configuration described above. The heater may have a configuration in which the heater comes into contact with the moisture absorbing/discharging member to heat the moisture absorbing/discharging member. In this case, the heater may not heat the air before passing through the moisture absorbing/discharging member.

The cooling target in the embodiments described above is the light modulation units, but not necessarily. The cooling target may include at least one of the light modulators, the light modulation units, the light source device, a wavelength conversion element that converts the wavelength of the light outputted from the light source device, a diffuser element that diffuses the light outputted from the light source device, and a polarization conversion element that converts the polarization direction of the light outputted from the light source device. According to the configuration described above, the portions of the projector can be cooled in the same manner described above.

In the embodiments described above, the description has been made with reference to the case where the invention is applied to a transmission-type projector, and the invention is also applicable to a reflection-type projector. The term "transmission-type" means that the light modulators each including a liquid crystal panel or any other component are of light transmissive type. The term "reflection-type" means that the light modulators are of light reflective type. The light modulators are each not limited, for example, to a liquid crystal panel and may, for example, be a light modulator using a micromirror.

In the embodiments described above, the projector using the three light modulators has been presented by way of example. The invention is also applicable to a projector using only one light modulator and a projector using four or more light modulators.

The configurations described above can be combined with one another to the extent that the combination causes no contradiction.

EXAMPLE

The cooling effect provided by the vaporization of the refrigerant W was compared with a cooling effect provided by air cooling to validate the former cooling effect. As Example, water was caused as the refrigerant W to adhere to the liquid crystal panels of the three light modulator, air was delivered toward the three light modulators, and the temperature of each of the liquid crystal panels was measured. As Comparative Example, no refrigerant W was caused to adhere to the liquid crystal panels of the three light modulator, air was delivered toward the three light modulators, and the temperature of each of the liquid crystal panels was measured. The measurement was performed in the following cases: The air was delivered to the light modulators at speeds of 1 m/s; 2 m/s; and 4 m/s. The amount of heat generated by each of the liquid crystal panels was set at 3.4 W.

Figure 28:
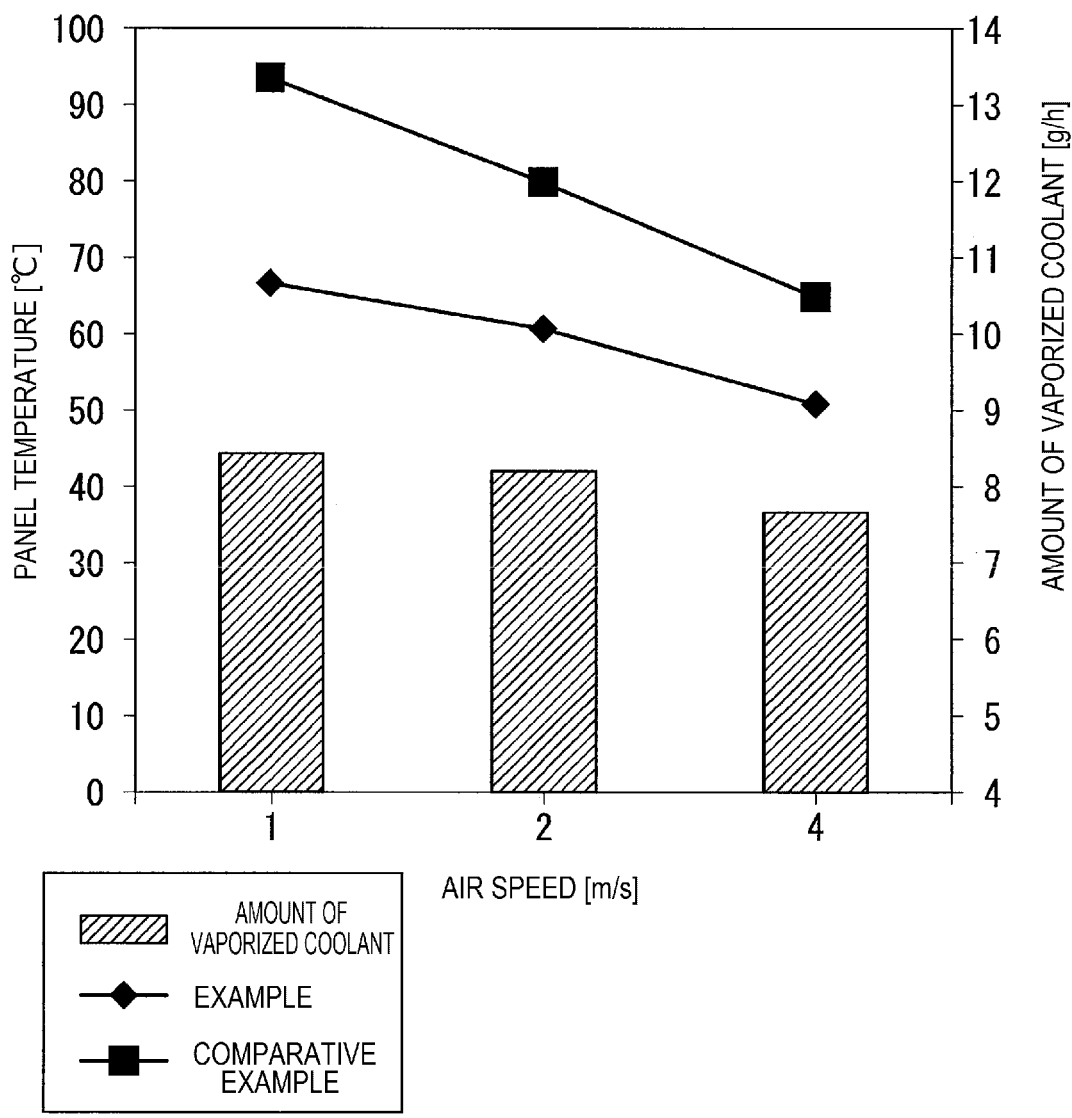
FIG. 28 shows graphs illustrating results of measurement in Example.

FIG. 28 shows the results of the measurement. In FIG. 28, the vertical axis represents the panel temperature [° C.] and the amount of vaporized refrigerant W [g/h], and the horizontal axis represents the air speed [m/s]. The panel temperature [° C.] is the average of the temperatures of the panels of the three light modulators. The amount of vaporized refrigerant W [g/h] is the sum of the vaporized refrigerants at the three light modulators.

In Example, the higher the air speed, the smaller the amount of vaporized refrigerant W, as shown in FIG. 28. It is, however, ascertained that the panel temperature [° C.] decreases despite of the decrease in the amount of vaporized refrigerant W in Example by a greater amount than in Comparative Example for each of the air speeds 1 m/s, 2 m/s, and 4 m/s. It is therefore ascertained that the cooling effect provided by vaporization of the refrigerant W is sufficiently useful as compared with the air cooling.

The cooling effect provided by the vaporization of the refrigerant W was compared with a cooling effect provided by liquid cooling to validate the former cooling effect. The panel temperature in a case where the liquid crystal panels were cooled by liquid cooling and the panel temperature in the case where the liquid crystal panels were cooled by the vaporization of the refrigerant W were measured, and the difference between the panel temperature in the case of the liquid cooling and the panel temperature in the case of the vaporization was calculated. The measurement was performed in a case where the surface area of each of the liquid crystal panels was equal to a reference area and the reference area multiplied by 2, 3, 4, and 5.

Figure 29:
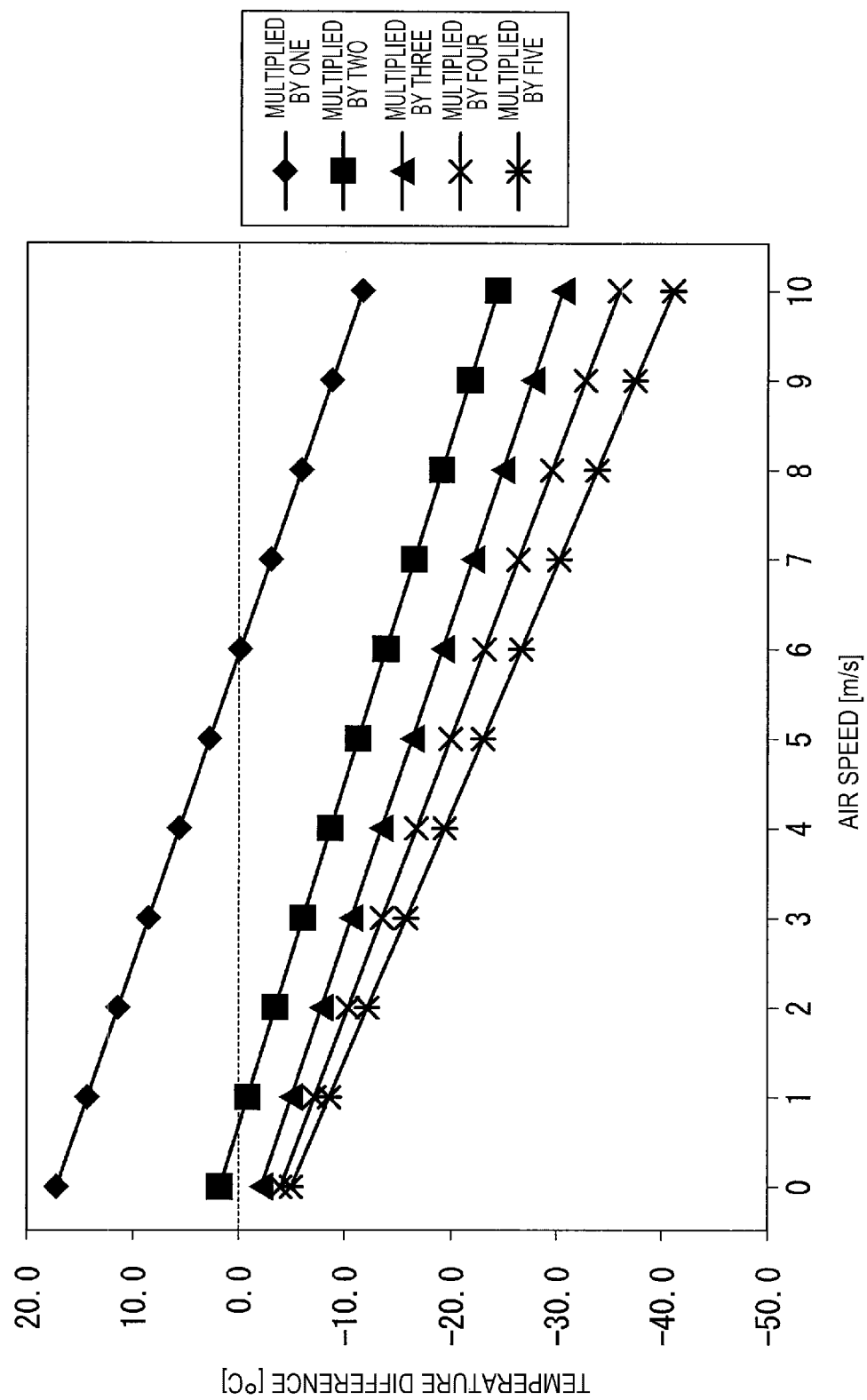
FIG. 29 shows graphs illustrating results of measurement in Example.

FIG. 29 shows the results of the measurement. In FIG. 29, the vertical axis represents the difference in the panel temperatures [° C.] between the liquid cooling and the cooling based on the vaporization, and the horizontal axis represents the air speed [m/s]. It is ascertained as shown in FIG. 29 that the cooling provided by the vaporization of the refrigerant W provides a cooling effect at least equal to the cooling effect provided by the liquid cooling even at the air speed of 0 m/s, that is, when no air is delivered in the case where the surface area of each of the liquid crystal panels is the reference area multiplied by 2. It is further ascertained that in the case where the surface area is equal to the reference area, the cooling based on the vaporization of refrigerant W provides a cooling effect at least equal to the cooling effect provided by the liquid cooling in a case where the air speed is higher than or equal to 6 m/s. It is therefore ascertained that the cooling effect provided by vaporization of the refrigerant W is also sufficiently useful as compared with the liquid cooling.

The entire disclosure of Japanese Patent Application No. 2017-251908, filed Dec. 27, 2017 is expressly incorporated by reference herein.

What is claimed is:

1. A projector comprising:
a light source device configured to emit light;
a light modulator configured to modulate the light emitted from the light source device in accordance with an image signal;
a projection optical device configured to project the light modulated by the light modulator; and
a cooler configured to cool a cooling target based on transformation of a liquid refrigerant into a gas refrigerant, the cooler including:
a refrigerant generator configured to generate the refrigerant by separating moisture from ambient air and generating water from the separated moisture as the liquid refrigerant, and
a refrigerant sender configured to send the generated liquid refrigerant toward the cooling target.

2. A projector comprising:
a light source device configured to emit light;
a light modulator configured to modulate the light emitted from the light source device in accordance with an image signal;
a projection optical device configured to project the light modulated by the light modulator; and
a cooler configured to cool a cooling target based on transformation of a refrigerant into a gas, the cooler including:
a refrigerant generator configured to generate the refrigerant, the refrigerant generator including:
a moisture absorbing/discharging member configured to rotate,
a first air blower configured to deliver air to a first portion of the moisture absorbing/discharging member in a first region of the moisture absorbing/discharging member,
a heat exchanger connected to the refrigerant sender,
a heater configured to heat a second portion of the moisture absorbing/discharging member in a second region of the moisture absorbing/discharging member different from the first region of the moisture absorbing/discharging member, and
a second air blower configured to deliver air that has heated the second portion of the moisture absorbing/discharging member to the heat exchanger; and
a refrigerant sender configured to send the generated refrigerant toward the cooling target;
wherein the heat exchanger generates the refrigerant from the air having flowed into the heat exchanger by cooling the air having flowed into the heat exchanger.

3. The projector according to claim 2, wherein the heat exchanger is configured to be cooled by air exhausted from the first air blower and that has passed through the moisture absorbing/discharging member.

4. The projector according to claim 2, wherein the first air blower delivers air to the cooling target.

5. The projector according to claim 2, wherein the refrigerant generator has a circulation path along which the air exhausted from the second air blower circulates, and the circulation path passes through the moisture absorbing/discharging member and the heat exchanger.

6. The projector according to claim 2, wherein:
the second air blower is configured to blow air through the second portion of the moisture absorbing/discharging member to deliver the air to the heat exchanger, and
the heat exchanger includes:
a heating main body configured to heat the air before passing through the second portion of the moisture absorbing/discharging member, and
the second air blower.

7. The projector according to claim 2, wherein:
the heater is configured to transmit heat from the light source device to the second portion of the moisture absorbing/discharging member, the second air blower is configured to blow air through the second portion of the moisture absorbing/discharging member to deliver the air to the heat exchanger, the refrigerant generator includes a first duct through which the air flows before passing through the second portion of the moisture absorbing/discharging member, the heater includes:

a heat sink exposing an interior of the first duct and an exterior of the first duct, and the second air blower, and the heat sink is configured to be heated by the heat from the light source device.

8. The projector according to claim 2, wherein:

the heater is configured to transmit heat from the light source device to heat the second portion of the moisture absorbing/discharging member, and the heater includes a heat pipe connected to the light source device.

9. The projector according to claim 2, wherein:

the heater is configured to transmit heat from the light source device to heat the second portion of the moisture absorbing/discharging member, the second air blower is configured to blow air through the second portion of the moisture absorbing/discharging member to deliver the air to the heat exchanger, the refrigerant generator includes a first duct through which the air flows before passing through the second portion of the moisture absorbing/discharging member, the first duct includes a metal section, the heater includes the metal section of the first duct and the second air blower, and the metal section is configured to receive the heat from the light source device.

10. The projector according to claim 2, wherein:

the refrigerant generator includes a driving force converter configured to generate a driving force that rotates the moisture absorbing/discharging member based on an air flow, and the driving force converter includes a vane disposed on the moisture absorbing/discharging member.

11. The projector according to claim 2, wherein the refrigerant generator includes a driver configured to rotate the moisture absorbing/discharging member.

12. The projector according to claim 2, wherein:

the heat exchanger includes a flow passage section through which the air flows, and the flow passage section includes a plurality of tubular pipes extending in a first direction, the flow passage section being cooled by a cooling medium flowing in a second direction at a point on the flow passage section where the flow passage section has the smallest cross-sectional area with respect to the first direction.

13. A projector comprising:

a light source device configured to emit light;

a light modulator configured to modulate the light emitted from the light source device in accordance with an image signal;

a projection optical device configured to project the light modulated by the light modulator; and a cooler configured to cool a cooling target based on transformation of a refrigerant into a gas, the cooler including:

a refrigerant generator configured to generate the refrigerant, and a refrigerant sender configured to send the generated refrigerant toward the cooling target, wherein the refrigerant generator includes:

a thermoelectric device having a heat absorbing surface and a heat radiating surface, a first heat exchanger connected to the heat absorbing surface of the thermoelectric device and the refrigerant sender, the first heat exchanger being configured to condense water vapor in air to generate the refrigerant;

a second heat exchanger connected to the heat radiating surface, and a third air blower configured to cool the second heat exchanger and cool the cooling target.

14. The projector according to claim 13, wherein:

the cooling target includes a light modulation unit including the light modulator and a hollow first holder configured to hold the light modulator, the refrigerant sender includes a second duct having an interior that communicates with an interior of the first holder and is configured to send the refrigerant to the interior of the first holder via the second duct, and the air delivered from the third air blower is delivered from the interior of the first holder to the interior of the second duct.

15. The projector according to claim 14, wherein:

the first heat exchanger is disposed in the interior of the second duct, and the second heat exchanger is disposed on an exterior of the second duct.

16. The projector according to claim 14, wherein:

a plurality of protruding sections are arranged on an inner surface of the second duct, and the refrigerant sender sends the refrigerant based on a capillarity occurring in gaps between the plurality of protruding sections.

17. A projector comprising:

a light source device configured to emit light;

a light modulator configured to modulate the light emitted from the light source device in accordance with an image signal;

a projection optical device configured to project the light modulated by the light modulator; and a cooler configured to cool a cooling target based on transformation of a refrigerant into a gas, the cooler including:

a refrigerant generator configured to generate the refrigerant, and a refrigerant sender configured to send the generated refrigerant toward the cooling target; the refrigerant sender being configured to send the refrigerant based on capillarity, and the refrigerant sender includes a porous connector connecting the refrigerant generator to the cooling target.

18. A projector comprising:

a light source device configured to emit light;

a light modulator configured to modulate the light emitted from the light source device in accordance with an image signal;

a projection optical device configured to project the light modulated by the light modulator;

a cooler configured to cool a cooling target based on transformation of a refrigerant into a gas, the cooler including:

a refrigerant generator configured to generate the refrigerant, and a refrigerant sender configured to send the generated refrigerant toward the cooling target; and a refrigerant holder disposed on the cooling target and configured to hold the refrigerant, the refrigerant holder being porous and attached to a surface of the cooling target, and at least part of the refrigerant holder is exposed when viewed from a refrigerant holder side in a layering direction in which the cooling target and the refrigerant holder are layered on each other.

19. The projector according to claim 18, further comprising a fixing member fixing the refrigerant holder such that the fixing member and the second holder sandwich the refrigerant holder in the layering direction, wherein:
the cooling target includes a light modulation unit including the light modulator and a second holder holding the light modulator,
the refrigerant holder is attached to a surface of the second holder,
part of the refrigerant holder is exposed when viewed from a fixing member side in the layering direction.

20. The projector according to claim 19, wherein:
the refrigerant holder is disposed on a surface of the second holder on a light incident side of the light modulator, and
the fixing member includes a frame section surrounding an edge portion of an image formation region of the light modulator.

21. The projector according to claim 19, wherein the refrigerant holder is disposed on a surface of the second holder on the light incident side of the light modulator and on a surface of the second holder on a light exit side of the light modulator.

22. The projector according to claim 19, further comprising:
a plurality of light modulation units including the light modulation unit;
a plurality of refrigerant holders including the refrigerant holder; and
a porous linkage section,
wherein:
a refrigerant holder of the plurality of refrigerant holders is disposed in each light modulation unit of the plurality of light modulation units,
the linkage section is configured to link the plurality of refrigerant holders to one another, and
the linkage section has a coating.

23. A projector comprising:
a light source device configured to emit light;
a light modulator configured to modulate the light emitted from the light source device in accordance with an image signal;
a projection optical device configured to project the light modulated by the light modulator;
a cooler configured to cool a cooling target based on transformation of a refrigerant into a gas, the cooler including:
a refrigerant generator configured to generate the refrigerant, and
a refrigerant sender configured to send the generated refrigerant toward the cooling target; and
a plurality of refrigerant holders disposed on the cooling target and configured to hold the refrigerant, the plurality of refrigerant holders protruding from a surface of the cooling target and arranged with gaps between adjacent refrigerant holders of the plurality of refrigerant holders.

24. The projector according to claim 1, wherein the cooling target includes at least one of the light modulator, the light modulation unit including the light modulator, the light source device, a wavelength conversion element configured to convert a wavelength of the light emitted from the light source device, a diffuser element configured to diffuse the light emitted from the light source device, and a polarization conversion element configured to convert a polarization direction of the light emitted from the light source device.

* * * * *